United States Patent
Ashly et al.

(10) Patent No.: US 11,620,713 B2
(45) Date of Patent: Apr. 4, 2023

(54) AUTOMATED REGULATORY COMPLIANCE FOR INSURANCE

(71) Applicant: Accenture Global Solutions Limited, Dublin (IE)

(72) Inventors: Peter Ashly, Chennai (IN); Srinivasan Krishnan Rajagopalan, Chennai (IN); Venkatesan Kamalakannan, Chennai (IN); Anand Yesuraj Prakash, Chennai (IN); Manikandan Chandran, Chennai (IN); Thangaraj Paramasivan, Tirunelveli (IN); Sivasubramanian Arumugam Jalajam, Chennai (IN); Loganathan Muthu, Kancheepuram (IN); Vinu Varghese, Bangalore (IN); Kumar Viswanathan, Bangalore (IN)

(73) Assignee: Accenture Global Solutions Limited, Dublin (IE)

( * ) Notice: Subject to any disclaimer, the term of this patent is extended or adjusted under 35 U.S.C. 154(b) by 869 days.

(21) Appl. No.: 15/725,540

(22) Filed: Oct. 5, 2017

(65) Prior Publication Data
US 2019/0066221 A1 Feb. 28, 2019

(30) Foreign Application Priority Data
Aug. 22, 2017 (IN) .............................. 201711029645

(51) Int. Cl.
*G06Q 40/08* (2012.01)
*G06Q 10/10* (2023.01)
(52) U.S. Cl.
CPC ............. *G06Q 40/08* (2013.01); *G06Q 10/10* (2013.01)
(58) Field of Classification Search
CPC ................................ G06Q 40/08; G06Q 10/10
(Continued)

(56) References Cited

U.S. PATENT DOCUMENTS 7,933,784 B2  4/2011  Brocci
8,190,455 B2  5/2012  Gore et al.
(Continued)

FOREIGN PATENT DOCUMENTS

AU       2016201927        10/2016
WO    WO-2009073151 A1 *  6/2009  ........... G06Q 10/087

OTHER PUBLICATIONS

Stobie, et al., Artifical Intelligence at Countrywide, Wexcon, 1996, 468-472. (Year: 1996).*

(Continued)

*Primary Examiner* — Hani M Kazimi
*Assistant Examiner* — Alison L. Lamb
(74) *Attorney, Agent, or Firm* — Fish & Richardson P.C.

(57) ABSTRACT

Methods, systems, and apparatus, including computer programs encoded on a computer storage medium, are described that enable identifying an insurance information associated with a property, retrieving one or more compliance rules related to the insurance information, automatically determining, based on the one or more compliance rules, whether the insurance information has a compliant status or a non-compliant status, in response to determining that the insurance information has the non-compliant status, processing the insurance information, based on one or more exception rules, to generate an exception waiver including a plurality of waiver parameters, applying the plurality of waiver parameters to a waiver model to determine a waiver confidence score, and based on the waiver confidence score selectively generate an insurance certificate for the property.

17 Claims, 18 Drawing Sheets

(58) Field of Classification Search
USPC .......................................................... 705/44
See application file for complete search history.

(56) References Cited

U.S. PATENT DOCUMENTS

| | | | |
|---|---|---|---|
| 8,655,595 | B1 | 2/2014 | Green et al. |
| 10,019,588 | B2* | 7/2018 | Garcia .................. G06F 21/604 |
| 2002/0069077 | A1 | 6/2002 | Brophy |
| 2003/0050804 | A1 | 3/2003 | Hendershot |
| 2004/0128170 | A1* | 7/2004 | MacKethan ........... G06Q 40/02 |
| | | | 705/38 |
| 2005/0065865 | A1 | 3/2005 | Salomon et al. |
| 2005/0075911 | A1* | 4/2005 | Craven .................. G06Q 40/08 |
| | | | 705/4 |
| 2005/0197953 | A1 | 9/2005 | Broadbent et al. |
| 2009/0024420 | A1 | 1/2009 | Winkler |
| 2009/0299775 | A1 | 12/2009 | Gore et al. |
| 2009/0327006 | A1 | 12/2009 | Hansan et al. |
| 2010/0042520 | A1 | 2/2010 | Rose et al. |
| 2010/0241556 | A1* | 9/2010 | Reinheimer ......... G06Q 40/025 |
| | | | 705/38 |
| 2013/0085787 | A1 | 4/2013 | Gore et al. |
| 2013/0096955 | A1 | 4/2013 | Pesci-Anderson |
| 2014/0004883 | A1 | 1/2014 | Catalano |
| 2014/0229205 | A1 | 8/2014 | Gibson |
| 2014/0244318 | A1* | 8/2014 | Drake .................... G06Q 40/08 |
| | | | 705/4 |
| 2015/0269588 | A1 | 9/2015 | Williams |
| 2015/0332410 | A1 | 11/2015 | Childers et al. |
| 2015/0339769 | A1* | 11/2015 | deOliveira ........... G06Q 40/025 |
| | | | 705/38 |
| 2016/0027121 | A1* | 1/2016 | Lucia .................... G06Q 40/08 |
| | | | 705/4 |
| 2016/0063635 | A1* | 3/2016 | Collazo ................. G06Q 40/08 |
| | | | 705/4 |
| 2016/0267082 | A1* | 9/2016 | Wong .................... G06F 16/164 |
| 2016/0292789 | A1* | 10/2016 | Rajagopalan .......... G06Q 40/08 |
| 2017/0091320 | A1* | 3/2017 | Psota .................... G06F 16/3337 |

OTHER PUBLICATIONS

U.S. Appl. No. 14/715,659, filed Oct. 6, 2016, Rajagopalan et al.
Australian Office Action for Application No. 2016201927, dated Nov. 28, 2016, 6 pages.
Canadian Office Action for Application No. 2,925,269, dated Jan. 11, 2017, 6 pages.
Canadian Office Action for Application No. 2,925,269, dated Nov. 16, 2017, 6 pages.
Australian Office Action for Application No. 2016201927, dated Nov. 28, 2017, 5 pages.
IN Office Action in Indian Application No. 201711029645, dated Dec. 18, 2019, 7 pages.

* cited by examiner

700

| Property Level | | | | | | | | |
|---|---|---|---|---|---|---|---|---|
| Term | Requirement | Available | Review 1 | Review 1 comment | Review 2 | Review 2 comment | Review 3 | Review 3 comment |
| Document Type | | FloodCertificates | Select | | Select | | Select | |
| Building Address | 555 NOWHERE ROAD,TOWN, FLA33801 | 555 NOWHERE HIGHWAY BUILDING I - # 0TOWN,FLA 33801 | Select | | Select | | Select | |
| Type of Evidence | | POLICY | Select | | Select | | Select | |
| If Limit is LTR- was excp raised? | | | Select | | Select | | Select | |
| Carrier Rating | | | Select | | Select | | Select | |
| Policy Period | | 11/02/2014 - 11/02/2015 | Select | | Select | | Select | |
| Flood zone | | SEE | Select | | Select | | Select | |
| Limit | | $500,000 | Select | | Select | | Select | |
| Deductible | | | Select | | Select | | Select | |
| Mortgagee/Loss payee Clause | Anne Mae and/or Its Assigns c/o JPMorgan Chase Bank N.A. and its successors and assigns (ISAOA). As their interests may appear | JP MORGAN CHASE BANK NA ISAOA | Select | | Select | | Select | |
| Mortgagee/Loss payee Address | Attn: TX1-555 PO Box 555 NONEXIST, TX 55555-555 | PO Box 555 NOWHERE,TX 55555-555 | Select | | Select | | Select | |
| Lapse in Coverage | | 11/02/2014 | Select | | Select | | Select | |
| Lapse in coverage for NB loans | | | Select | | Select | | Select | |
| Lapse in coverage for loans Re-Map loans | | | Select | | Select | | Select | |
| Private Flood | | | Select | | Select | | Select | |
| If Yes-is it complaint based on FEMA 6 | | | Select | | Select | | Select | |
| If FP available for this building? | | No | Select | | Select | | Select | |
| Waivers | | | | | | | | |
| Term | Requirement | Available | Review 1 | Review 1 comment | Review 2 | Review 2 comment | Review 3 | Review 3 comment |
| Does this image qualify for FP Removal? | | | Select | | Select | | Select | |
| Reported Dt in the weekly FP cancellation report? | | | Select | | Select | | Select | |
| Letter sent date for App with POP | | | Select | | Select | | Select | |
| Fax sent Dt for Invalid document | | | Select | | Select | | Select | |

| Term | Requirement | Available | Review 1 | Review 1 comment | Review 2 | Review 2 comment | Review 3 | Review 3 comment |
|---|---|---|---|---|---|---|---|---|
| Document Type | | FloodCertificates | Yes | | Yes | | Select | |
| Building Address | 555 CANTFIND,CT HOOPDALE, CA, 55555 | 784 cantfind ct, hoopdale ca 55555 | Complaint | | | | Select | |
| Type of Evidence | | POLICY | Complaint | | | | Select | |
| If limit is LTR- was excp raised? | | 12/20/2014-12/20/2015 | Yes | Exception raised | Yes | Exception raised | Select | |
| Carrier rating | | | Complaint | | Complaint | | Select | |
| Policy Period | | 12/20/2014-12/20/2015 | Yes | | Yes | | Select | |
| Flood zone | AO | ao | Non-Complaint | Exception raised | Non-Complaint | | Select | |
| Limit | 1670953.36 | $250,000 | Complaint | | Complaint | | Select | |
| Deductible | $50,000 | $1,000 | Complaint | | Complaint | | Select | |
| Mortgagee/Loss payee Clause | JPMorgan Chase Bank N.A. and its successors and assigns | JPMorgan Chase bank N.A. ISAOA | Complaint | | Complaint | | Select | |
| Mortgagee/Loss payee Address | Attn: TX1-555 PO Box 555 ARNDBEND, TX 55555-5555 | Atten: TX1-555 PO Box 555 CRDNO, TX 75019-9005 | Complaint | | Complaint | | Select | |
| Lapse in Coverage | 12/20/2014 | 12/20/2014 | Complaint | | Complaint | | Select | |
| Lapse in Coverage for NB loans | | | Complaint | | Complaint | | Select | |
| Lapse in coverage for Re-Map loans | | | Complaint | | Complaint | | Select | |
| Private Flood | | | No | | No | | Select | |
| If Yes-is it complaint based on FEMA 6 | | | Select | | Select | | Select | |
| Is FP available for this building? | | No | No | | No | | Select | |

Waivers

| Term | Requirement | Available | Review 1 | Review 1 comment | Review 2 | Review 2 comment | Review 3 | Review 3 comment |
|---|---|---|---|---|---|---|---|---|
| Does this image qualify for FP Removal? | | | Select | | Select | | Select | |
| Reported Dt in the weekly FP cancellation report? | | | Select | | Select | | Select | |
| Letter sent date for App with POP | | | Select | Valid doc received | Declarations pages | | Select | |
| Fax sent Dt for invalid document | | | Select | Valid doc received | Declarations pages | | Select | |

Overall Comments Review1: Renewal cert received & itac has Been updated & processed as new & It is non complaint due limit exception Overall Comments Review2: Renewal declarations pages rcvd. itac updated and processed as new. Non complaint due limit exception Overall Comments Review3:

FIG. 8

FP Process-Addition

| Field | Value |
|---|---|
| Assignment Type: | Exception Data -- Limit less than required |
| Loan Number: | 555555555 |
| Prop Seq/Bldg No: | 3 |
| Prop Add/Bldg Address: | 16/18/20 ASSOCIATED PK, NEVERLAND, ZZ, 55555555555 |
| Coverage Type: | NFIP - Flood |
| Wind Included: | Select ▼ |
| Existing CERT Number: | |
| Effective Date of FP: | 04/26/2012 |
| Expire date of FP: | 04/26/2013 |
| Term: | 12 |
| Last Edited by: | archanaka |
| Force Placed with: | DOE ▼ |

Coverage Requirement

| Loan: | 5555555555 | Borrower Name: | |
|---|---|---|---|
| Investor ID: | | Coverage: | --Select-- ▼ |
| Property Name: | Property 1 | Property Address: | 16/18/20 ASSOCIATEDPK,NEVERLAND, |

| Coverage | Coverage Requirement | Limit | Limit Verbiage | LOR# Months | Occurrence Limit | Aggregate Limit | Deductible | Deductible % | Deductible Verbiage | Delete Coverage | Notes |
|---|---|---|---|---|---|---|---|---|---|---|---|
| Equipment Breakdown | No | | 100% Full Replacement Cost | | | | $10,000 | 1 | The greater of $1000 or %1 of coverage amount | | ☐ |
| Builder's Risk | No | | 100% Construction Cost or Completed Replacement Cost | | | | | | | | ☐ |
| Business Interruption/ Loss of Rents | Yes | | | 12 Months | | | | | | | |

FIG. 9

Invoice Processing

Loan Number: 07555555

Coverage Name:
- ☑ Automobile Liability
- ☐ Director's & Officer's Liability
- ☐ Excess property
- ☑ General Liability
- ☑ Terrorism
- ☐ Theft
- ☑ Black Mold
- ☑ Earthquake
- ☐ Extended Period of Indemnity
- ☑ Ordinance or Law
- ☐ Windstorm
- ☐ Employer's Liability
- ☑ Boiler & Machinery
- ☐ Environmental
- ☐ Fidelity Bond
- ☐ Professional Liability
- ☑ Worker Compensation
- ☐ Crime
- ☑ BI/LOR
- ☑ Excess/Umbrella Liability
- ☐ Flood
- ☑ Property/Hazard
- ☐ Contents
- ☐ Error's & Omission

Effective Date: 1/1/2014  Expiration Date: 1/1/2015
Policy Number: BOP555555  Premium Due Date: 1/1/2014
Disbursement Frequency: Annual  Next Remit Date: 1/1/2015

Letter History

Loan#: 555555555
Borrower Name: James Jo
Investor Name: Phase – 1
Investor Id: 0
ProsUp #: 00/00/0000

[Back] [EXPORT TO EXCEL]

| Sl.# | Deal Name | Loan# | Borrower Name | Issue Date | Letter Type | Coverages | Letter |
|---|---|---|---|---|---|---|---|
| 1.0 | | 555555555 | James Jo | 11/05/2013 | 08_JPMC_Insurance Expiration – Second Notice_Non Escrowed | Property/Hazard | View |
| 2.0 | | 555555555 | James Jo | 09/26/2013 | 02_JPMC_Insurance Expiration – First Notice_Non Escrowed | Business Interruption/Loss of Rents, General Liability, Property/Hazard | View |
| 3.0 | | 555555555 | James Jo | 06/10/2013 | 10_JPMC_Insurance Expiration – Final Notice_Flood_Non Escrowed | NFIP – Flood | View |
| 4.0 | | 555555555 | James Jo | 05/17/2013 | 06_JPMC_Insurance Expiration – Second Notice_Flood_Non Escrowed | NFIP – Flood, | View |

FIG. 9 (continued)

AUTOMATED REGULATORY COMPLIANCE FOR INSURANCE

CROSS-REFERENCE TO RELATED APPLICATION

This application claims priority to Indian Patent Application No. 201711029645, filed on Aug. 22, 2017, entitled "Automated Regulatory Compliance for Insurance," the entirety of which is hereby incorporated by reference.

TECHNICAL FIELD

This specification generally relates to automated reviewing, tracking, and enabling of compliance.

BACKGROUND

Computerized systems enable processing of documents to determine the content and nature of the documents. For example, some computerized systems use optical character recognition (OCR) to extract information about textual content in documents, and/or image processing techniques to extract information about image content in documents. A computerized system may then perform processing on the extracted textual or image information to determine the nature of the documents' contents.

SUMMARY

This specification generally relates to systems and techniques that perform automated review and tracking of compliance of documents with respect to one or more rules or regulations, and, if a deficiency in compliance is detected, automatically perform remedial actions to enable compliance.

In one aspect, a computer-implemented method is executed by one or more processors. The method includes identifying an insurance information associated with a property, retrieving one or more compliance rules related to the insurance information, automatically determining, based on the one or more compliance rules, whether the insurance information has a compliant status or a non-compliant status, in response to determining that the insurance information has the non-compliant status, processing the insurance information, based on one or more exception rules, to generate an exception waiver including a plurality of waiver parameters, applying the plurality of waiver parameters to a waiver model to determine a waiver confidence score, and based on the waiver confidence score selectively generate an insurance certificate for the property.

In some implementations, the one or more exception rules include at least one of an exception coverage percentage, an exception type, an exception level, an exception term, and an exception priority.

In some implementations, based on the waiver confidence score, processing the exception waiver, based on secondary waiver rules, to determine a secondary waiver confidence score, the secondary waiver rules including the one or more waiver rules and at least one additional waiver rule. The method further includes based on the secondary waiver confidence score selectively generating an insurance certificate for the property.

In some implementations, the insurance information includes at least one of a property location, an insurance policy period, an insurance limit, an insurance deductible, and a lapse in insurance coverage. In some implementations, the one or more compliance rules include a government law or a government regulation related to the insurance information. The method further includes determining, based on the one or more compliance rules, whether the insurance information has the compliant status or the non-compliant status includes: determining, based on the government law or the government regulation, hazard data that indicates one or more risk zones, comparing a geographic location of the property with the one or more risk zones, determining a designated insurance premium or a designated insurance rate for the property based on comparing a geographic location of the property with the risk zones, and determining whether the insurance information complies with the designated insurance premium or the designated insurance rate for the property.

In some implementations, determining, based on the one or more compliance rules, whether the insurance information has the compliant status or the non-compliant status includes: determining whether the property complies with a requirement to purchase insurance as a result of receiving risk-related financial assistance from a federal government.

In some implementations, determining, based on the one or more compliance rules, whether the insurance information has the compliant status or the non-compliant status includes: automatically identifying one or more parameters of the insurance information, and determining whether the one or more parameters of the insurance information satisfy the one or more compliance rules. The method further includes, automatically identifying one or more parameters of the insurance information includes: automatically determining, based on the insurance information for the property, one or more parameters related to a risk zone, an insurance policy period, an insurance limit, an insurance deductible, or a lapse in insurance coverage.

In some implementations, determining, based on the one or more compliance rules, whether the insurance information has the compliant status or the non-compliant status includes: determining that the property is not associated with a valid insurance certificate.

In some implementations, the method further includes displaying, on a display of a mobile electronic device, a graphical user interface displaying information regarding a progress of determining a compliance status of the insurance information with the one or more rules.

In some implementations, providing the result of determining the compliance status of the insurance information with the one or more rules includes: transforming a template letter to indicate the result of determining the compliance status of the insurance information, and automatically generating a postal transmission of the transformed template letter indicating the result of determining the compliance status of the insurance information, wherein the postal transmission is addressed to contact information associated with the property.

In some implementations, providing the result of determining the compliance status of the insurance information with the one or more rules includes: transmitting, over an electronic network to an electronic device associated with the property, the result of determining, based on the one or more compliance rules, whether the insurance information has the compliant status or the non-compliant status includes.

In some implementations, providing the result of determining the compliance status of the insurance information with the one or more rules includes: transmitting information indicating at least one deficiency of the insurance information with respect to the one or more rules and at least one corrective action associated with the at least one deficiency.

In some implementations, the method further includes obtaining updated insurance information associated with the property, determining that the updated insurance information does not comply with the one or more rules, and based on determining that the updated insurance information does not comply with the one or more rules, generating a force-placed insurance certificate for the property.

In some implementations, generating the prioritized ordering includes performing predictive analytics that identifies one or more high-risk properties from among the plurality of properties.

All or part of the features described throughout this application can be implemented as a computer storage medium encoded with a computer program, the computer program including instructions that are executable by one or more processors. All or part of the features described throughout this application can be implemented as an apparatus, method, or electronic system that can include one or more processing devices and memory to store executable instructions to implement the stated functions.

The details of one or more implementations are set forth in the accompanying drawings and the description below. Other features will be apparent from the description and drawings, and from the claims.

BRIEF DESCRIPTION OF DRAWINGS

FIGS. 7 to 9 are examples of graphical user interfaces (GUIs) that may be used by a system that automatically reviews, tracks, and enables compliance in the context of risk protection policies.

Figure 1:
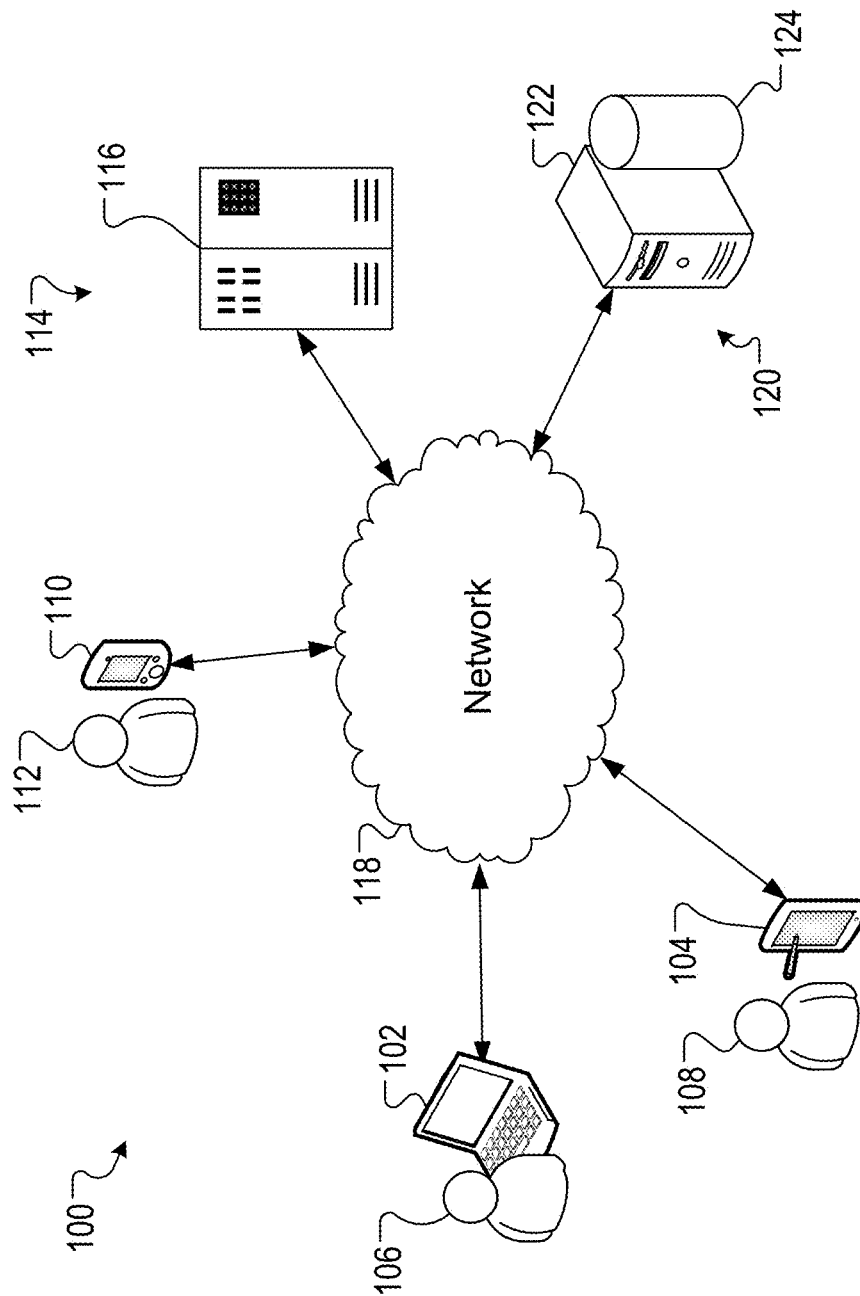
FIG. 1 is a block diagram illustrating an example of a system that can execute implementations of the present disclosure.

In the following text, a detailed description of examples will be given with reference to the drawings. It should be understood that various modifications to the examples may be made. In particular, elements of one example may be combined and used in other examples to form new examples. Like reference symbols in the various drawings indicate like elements.

DETAILED DESCRIPTION

Techniques according to the present disclosure automatically review, track, and enable compliance with respect to one or more rules or regulations. The techniques may be implemented in systems, methods, computer-readable media, or other forms as described herein. For example, a system according to the present disclosure may automatically review one or more documents associated with an entity and determine whether the documents comply with a set of rules and/or regulations. If the system detects non-compliance in the documents, then the system may perform one or more remedial actions to enable compliance, such as alerting one or more entities associated with the documents, for example by sending instructions on how to comply with the rules and regulations, and monitoring and reviewing corrections to the documents. In some implementations, if the entity associated with the non-compliant document fails to comply with the rules and regulations, then the system may take further remedial actions, such as automatically generating, on behalf of the entity, a policy that is compliant with the rules and regulations.

As an example, a document may be related to protection of a property against loss or damages. The property may be a piece of land, a vehicle, a non-physical property, or other types of property that can be protected against loss or damage. The document may include a protection certificate that reflects specific details regarding the type and scope of protection for the property. In some implementations, an entity may be required to possess a particular type of protection certificate, for example, according to governmental or private rules and regulations.

Implementations of the present disclosure will be described in further detail herein with reference to an example context. Within the example context, the protection certificate can be a flood protection certificate. It is contemplated, however, that the implementations of the present disclosure can be realized with any other types of risk protection certificates. A risk protection certificate can define the protection, or insurance of a property against a damage caused by a particular risk factor. A flood protection certificate protects, or insures, a property against water damage caused by floods. An entity, such as a homeowner or business, may be required to possess a particular type of flood protection certificate for various reasons. This requirement may be imposed, for example, by a governmental or private institution. For example, a homeowner who obtains a loan, or mortgage, from a private mortgage institution to purchase a piece of land in a high-risk flooding area may be required by the private mortgage institution to obtain a flood protection certificate. As another example, a business owner who receives flood-related financial assistance from a governmental institution may be required to obtain a flood protection certificate for the business.

However, an institution that imposes a requirement on a homeowner or business to possess a flood protection certificate may face difficulties in verifying and/or enforcing compliance. Non-compliance may be caused by various reasons. For example, the homeowner or business may possess an incomplete flood protection certificate, or may possess a flood protection certificate that has not been updated to reflect changes in the law, or may not possess a flood protection certificate at all. In such cases, a regulating institution, which may deal with a large number of homeowners or businesses, may face challenges not only in determining whether a particular flood protection certificate is fully compliant with potentially complex laws and regulations, but also in ensuring that any deficiencies in a non-compliant certificate are promptly corrected.

Systems and techniques according to the present disclosure automatically review and track compliance of a flood protection certificate with respect to a set of rules and regulations, and automatically enable remedial actions to correct deficiencies in the flood protection certificate. As such, the system may help mitigate the challenges described above by improving the efficiency and turnaround time of processing a flood insurance certificate, as well as by creating controls that enable an entity to more easily comply with the rules and regulations.

As an example, the system may monitor and enable compliance of flood insurance certificates with respect to a governmental law, such as the Biggert Waters Flood Act. The system may thus help mitigate violations and subsequent penalties of the governmental law. In some implementations, the system may automatically generate, as result of the compliance review and tracking, audit information that may be used by governmental entities, such as Office of the Comptroller of the Currency (OCC) conducting audits of a flood insurance certificate.

The system may perform one or more types of analysis to review and track compliance. In some implementations, an insurance tracking and compliance (ITAC) system may be modified to include additional controls identified through flood intervention control. The system may generate automated flood recon reports developed in the ITAC system to monitor the status of a flood protection certificate at different stages of compliance review.

As such, the system may enable a client, such as a mortgage-issuing institution, to more efficiently and more accurately conduct and track compliance reviews of flood protection certificates, such as those held by borrowers of mortgages. The system may access data related to appropriate laws, rules, and/or regulations to automatically analyze compliance of the borrower's flood protection certificate. The system may automatically report the findings of the analysis to the client, such as the mortgage-issuing institution. In some implementations, the system may utilize a mobile-based platform to provide results and real-time tracking of the compliance review to mobiles devices of the client.

In some implementations, if an entity, such as a mortgage borrower, consistently fails to comply or fails to take action to correct deficiencies in a flood protection certificate, then the system may automatically perform intervention controls to ensure compliance. For example, the system may generate, or "force-place," a compliant flood protection certificate for the non-compliant borrower and charge the borrower with a premium for the new flood protection certificate. As such, the system may help ensure that federal laws and/or private regulations are not violated, potentially resulting in savings for the client, such as the mortgage-issuing institution. In some implementations, the system may determine that a forced-placed flood protection certificate was incorrectly generated, and in such scenarios, the system may automatically generate a force-place cancellation report to enable efficient and speedy reimbursement of the force-placed premium back to the borrower.

FIG. 1 depicts an example system 100, in which implementations of the present disclosure may be implemented. In the example system 100 of FIG. 1, client devices 102 and 104, operated by users 106 and 108, respectively, may execute a mobile compliance review, tracking, and enablement platform. For example, users 108 and 108 may be employees of a governmental institution, a mortgage-issuing institution, or other entity that attempts to verify compliance of a risk protection certificate.

The system may review and track compliance of risk protection certificates and provide instructions to associated agents, such as borrowers of mortgages, regarding results of the review and, in some implementations, recommended actions to take in order to achieve compliance. For example, in the example of FIG. 1, the system may transmit results of the compliance review and compliance instructions to one or more electronic devices, such as electronic device 110 operated by user 112. The system may utilize any suitable form of communication to transmit the information to the user 112, such as a phone call, email, text message, etc. In some implementations, the system may transmit the information to the user 112 by non-electronic techniques, such as by postal mail.

In some implementations, there may additionally be one or more remote systems, such as remote system 114, including a computer server, such as computer server 116 in FIG. 1. A remote system 114 may be, for example, a governmental system that stores various laws, rules, and regulations associated with determining compliance of a risk protection certificate. In some implementations, the remote system 114 may be operated by a private institution, such as the mortgage-issuing institution, and may store one or more rules or regulations that may be used to determine compliance of a borrower's risk protection certificate. The remote system 114 may be implemented as one or more servers, located at a central facility or distributed across diverse geographic locations, such as a cloud-based storage system.

In some implementations, the computing devices 102, 104, and/or 110 are computing devices, such as laptop or desktop computers, smartphones, personal digital assistants, wearable computers, portable media players, tablet computers, or other appropriate computing devices that can be used to communicate with an electronic communication network, such as electronic communication network 118 in FIG. 1. In addition, one or more of the computing devices 102, 104, and/or 110 may perform client-side operations, as discussed in further detail herein.

In some implementations, the automated compliance review, tracking, and enablement platform may be hosted by a system, such as host system 120 in FIG. 1. The host system 120 may be physically located at a remote location, such as a central business center or cloud server. In some implementations, the host system 120 may provide client-side information that is downloaded on web browsers or applications executed on the computing devices 102, 104, and/or 110.

The host system 120 may include one or more servers, such as server 122, and one or more storage devices, such as storage device 124, storing computer-readable instructions. The server 122 may communicate, as needed, with the computing devices 102, 104, and/or 110 executing the automated compliance review, tracking, and enablement platform. For example, in some implementations, the host system 120 may, in addition to providing client-side software for download by the computing devices 102, 104, and/or 110, additionally store server-side information that is used by the automated compliance review, tracking, and enablement platform. The host system 120 may communicate with the computing devices 102, 104, and/or 110 by a communication medium, such as a communication network 118.

In some implementations, the network 118 is a public communication network, such as, for example, the Internet, cellular data network, or a telephone network accessed via dialup modems. The network 118 may also be a private communications network, such as, for example, private LAN, leased lines. The network 118 may include one or more networks. The network(s) may provide for communications under various modes or protocols, such as, for example, Wi-Fi. Global System for Mobile communication (GSM) voice calls, Short Message Service (SMS), Enhanced Messaging Service (EMS), or Multimedia Messaging Service (MMS) messaging, Code Division Multiple Access (CDMA), Time Division Multiple Access (TDMA), Personal Digital Cellular (PDC), Wideband Code Division Multiple Access (WCDMA), CDMA2000, General Packet Radio System (GPRS), among others. For example, the communication may occur through a radio-frequency transceiver. In addition, short-range communication may occur, such as using a BLUETOOTH, Near Field Communications (NFC), or other such transceiver.

Figure 2:
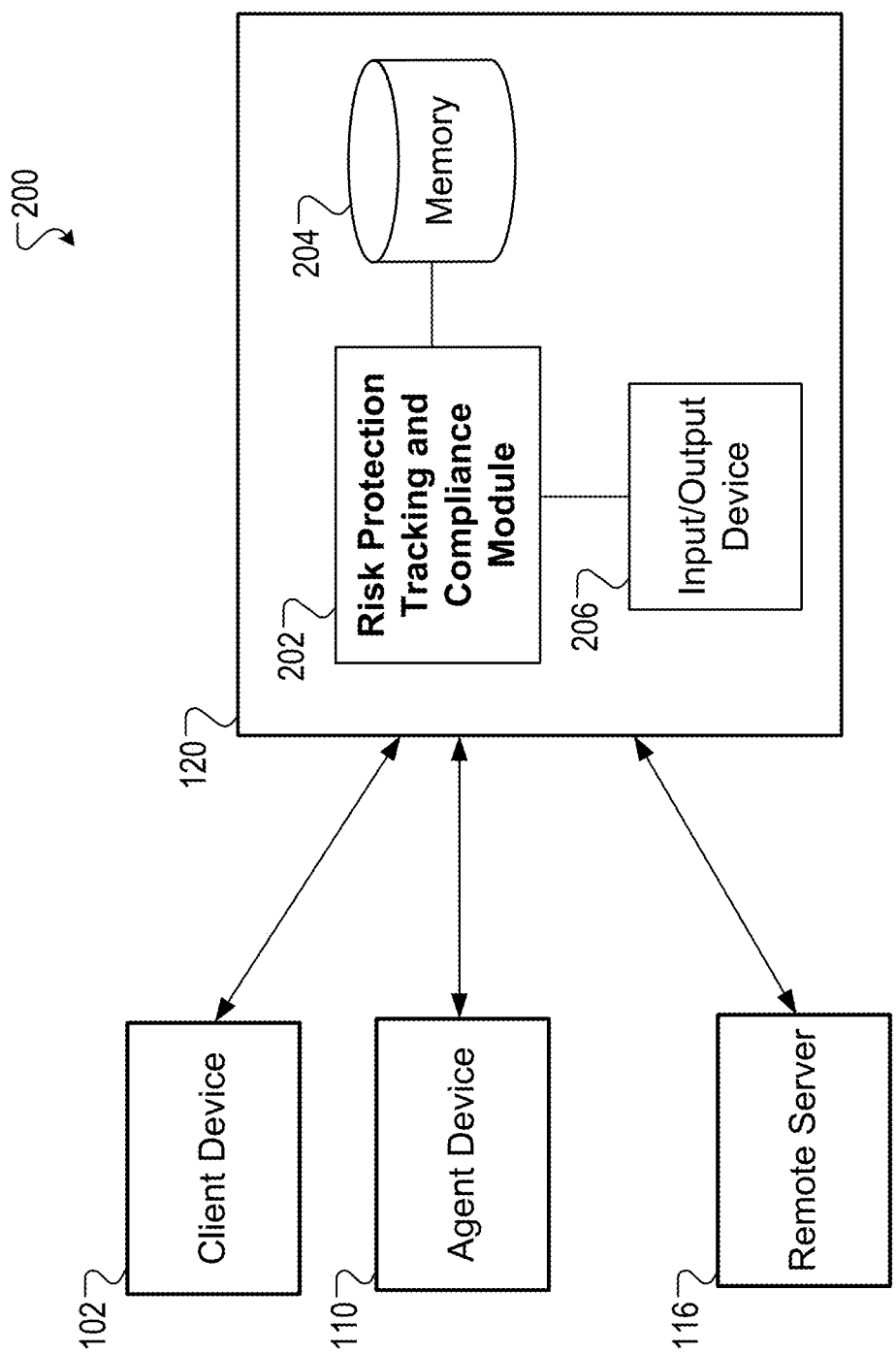
FIG. 2 is a block diagram illustrating an example of components of a system that automatically reviews, tracks, and enables compliance.

FIG. 2 depicts an example of components of a system 200 that performs automated compliance review, tracking, and enablement. In the example of FIG. 2, the system 200 includes a host system 120. The host system 120 may include a risk protection tracking and compliance device 202. The risk protection tracking and compliance device 202 may include, or communicate with, one or more processors and one or more storage devices that are configured to implement automated risk protection tracking and compliance review. For example, the risk protection tracking and compliance device 202 may utilize one or more memory modules 204 to store data related to risk protection tracking and compliance, or other information. The risk protection tracking and compliance device 202 may also receive inputs from users, such as users 106, 108, 112, or other users. For example, the risk protection tracking and compliance device 202 may use one or more input/output devices 206 to communicate information with other devices, such as client device 102, the agent device 106, and the remote server 116.

The risk protection tracking and compliance device 202 may be a module that is added to a general purpose computer to create a modified computer that achieves the functionality described. In some implementations, the risk protection tracking and compliance device 202 includes specialized hardware that is designed to control operations of other components of the risk protection tracking and compliance system 200. The risk protection tracking and compliance device 202 may interact with one or more other specialized components (which may include specialized hardware) to achieve the functionality described.

Figure 3:
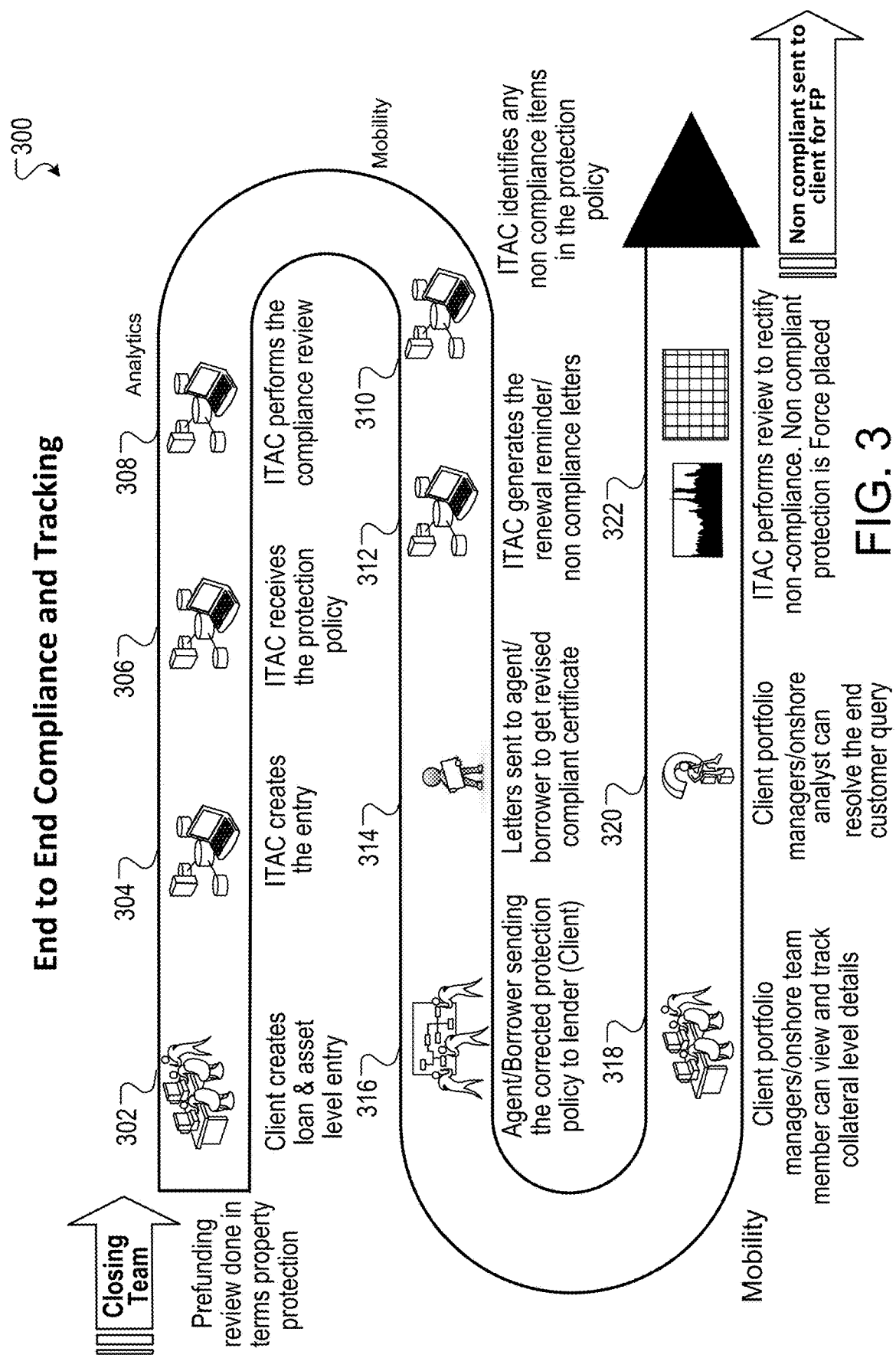
FIG. 3 is a flow chart illustrating an example of automatically reviewing, tracking, and enabling compliance.

FIG. 3 depicts an example of a process of end to end compliance and tracking of property protection policies. The example process 300 in FIG. 3 illustrates an insurance tracking and compliance (ITAC) system that may be used as a tracking tool for commercial mortgage insurance. The ITAC system may have built in tracking and reporting for workflow, quality and productivity. The ITAC system may be built on any suitable server technology and may be accessible, for example, online through a browser.

In the example of FIG. 3, the ITAC system may be used to track insurance compliance status, perform invoice processing, and/or perform lender force placements for different kinds of mortgage insurances, such as, general property insurance (theft, fire, etc.), mortgage insurance, flood insurance, homeowner insurance, and/or hazard insurance. In some implementations, the ITAC system may be implemented as a Web based application. Such scenarios may offer smaller initial set-up effort and easy access for clients. In some implementations, the system may provide integrated email capability that helps reducing the cycle time for correspondence. The easily customizable web interface along with robust reporting capabilities provided by the ITAC system may facilitate lenders to monitor the status of property insurance for various mortgagees.

The ITAC workflow may provide a real time status tracking of each loan along with imaging repository capabilities. The ITAC system may be capable of performing data validation and create workflows based on the priority of the loans for insurance compliance audit. The system may use integrated pre-defined letter templates to send the correspondence to the borrowers during pre- and post-insurance expiration campaigns. The ITAC system may support insurance invoice processing to extend the insurance coverage. In some implementations, the ITAC system may be enable configuration with a lender based on portfolio requirements to conduct insurance status tracking audits.

The ITAC system may also have built-in analytics to enable the lender to initiate force placements to keep the properties insured and to safe guard the interest of the lender. In some implementations, the system may use a built-in data reconciliation engine that provides timely reporting at various lender levels and portfolio levels with a status of collaterals whose insurance is covered, expired, uncovered, as well as cover outstanding exceptions and lender force placements. The exceptions define an acceptable discrepancy between two or more terms of an insurance policy. The exceptions can include exception zones, exception rules, or a combination of exception zones (e.g., flood zones) and exception rules. The exception zones define geographical perimeters within which an exception may be applied. An insured property can be entirely within a particular zone or parts of the insured property can correspond to different exception zones (e.g., the office areas of an insured property can be in a different zone than the parking area of the insured property). For example, the zones can be classified based on a risk score in multiple categories (e.g., A, B, C, and D). Some zones can mandate compliance with an insurance rule or requirement and other zones can enable optional insurance.

The exception rules define the association between two or more parameters of the insurance certificate, which in a particular combination can enable an exception. The parameters of the insurance certificate can include coverage value, current property value, age of property, changes associated with the property, reliability score of the insurer, reliability score of the insured entity, protection features that decrease a risk, number of insurances, and/or any other parameters that can be included in the insurance policy. In some implementations, the exception rules define a penalty that is associated with a deviation from insurance rules. The system may also be capable of performing portfolio level analytics and recommend institutions or lenders for group insurance.

The example process 300 of insurance tracking and compliance in FIG. 3 includes two phases of processing. One phase involved tracking information from insurance certificates into the ITAC application, and the second phase involves reviewing the tracked information against one or more rules or regulations and detecting any non-compliance.

In the first phase, a client such as a mortgage-issuing institutions receives a prefunding review for property protection and creates a loan and asset level entry (302). The ITAC system (e.g., a computer server and/or a computing device) receives the feed from the client and automatically creates an entry (304). The ITAC system then receives the protection policy associated with the loan from the client (306).

In the second phase, the ITAC system performs analytics to perform compliance review of the protection policy (308). The ITAC system identifies any noncompliance in the protection policy (310) and automatically generates alerts (312), such as renewal reminders and/or non-compliance letters, which are sent to the agent or borrower of the loan (314). The agent or borrower of the loan may then correct the protection policy based on the letters send the correct protection policy to the lender (316). The client may then view and track the collateral level details of the protection policy (318) and resolve the end customer query (320). The ITAC system then performs one or more actions to rectify non-compliance (322). For example, the ITAC system may force-place a protection policy for a loan if the agent or borrower fails to rectify non-compliance. Further details of the compliance review process in the specific context of risk protection policies are further described in detail with reference to FIGS. 4 and 5.

Figure 4:
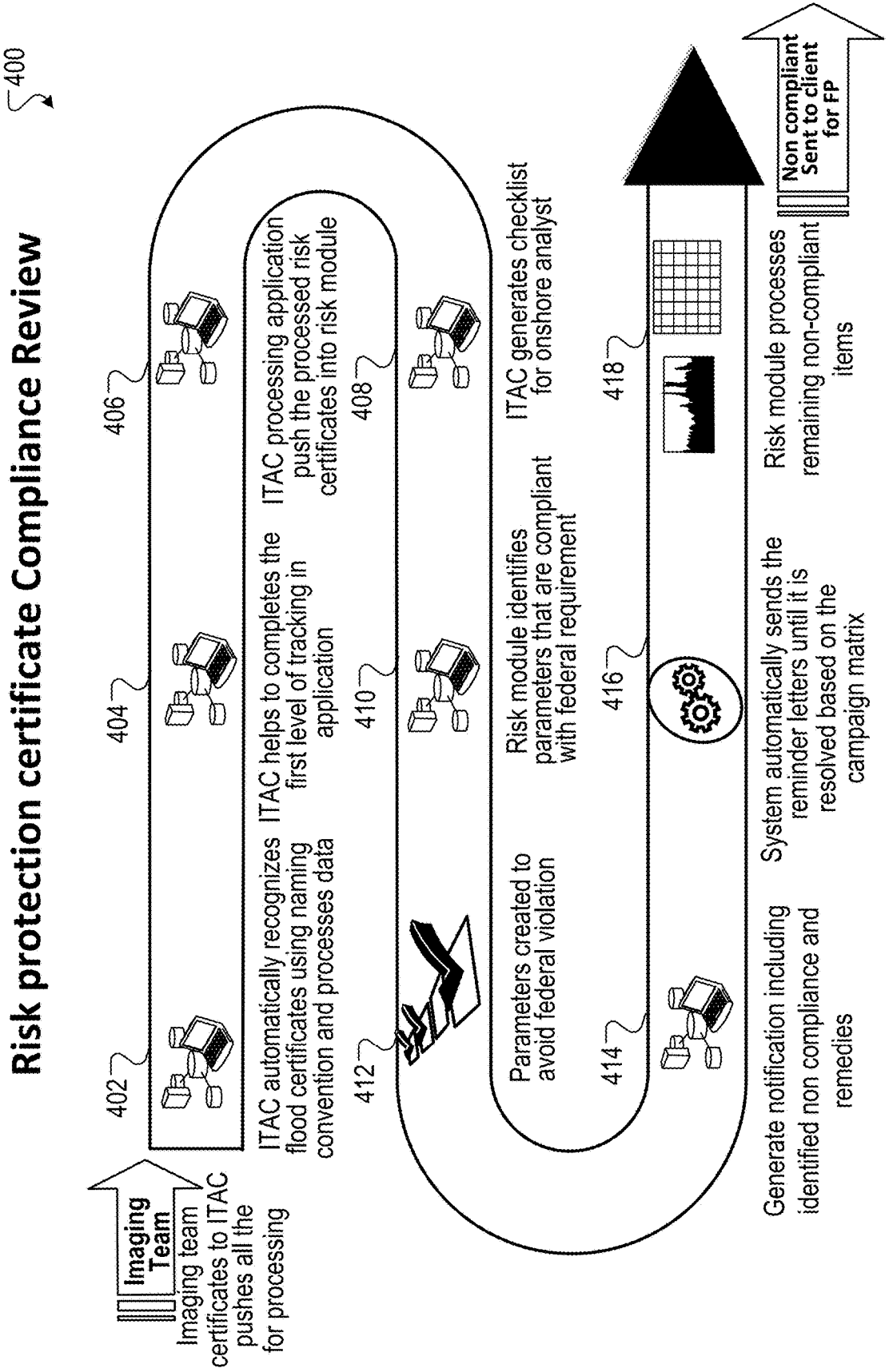
FIG. 4 is a flow chart illustrating an example of automatically reviewing, tracking, and enabling compliance in the context of flood protection policies.

FIG. 4 depicts an example of details of a compliance review of a risk protection certificate. In the example process 400 of FIG. 4, the risk insurance module tracks the progress of reviewing the compliance of risk protection certificates by using a checklist and checkpoints that monitor governmental parameters and guidelines, such as Federal Emergency Management Agency (FEMA) regulations.

The ITAC system receives risk protection certificates for analysis (e.g., as in operation 306 of FIG. 3). The ITAC system automatically recognizes the risk protection certificates, for example by using a naming convention for risk protection policies (402). The ITAC system then performs a first level of tracking (404) and processes the risk protection certificates (406). The risk insurance module generates a checklist including multiple parameters to be verified according to one or more governmental parameters and guidelines, such as federal rules (408). The risk insurance module identifies parameters that are relevant to determining compliance of the risk protection certificates (410).

The risk insurance module uses the checklist and the identified parameters to check the parameters for compliance with the FEMA regulations (412). The risk insurance module identifies any non-compliant items and generates a notification (e.g., letter and/or electronic message) for the borrower of the loan about the non-compliant items (414). The notification can include one or more recommend actions to remedy the deficiencies. For example, the risk insurance module can access and process past exception handlings to identify a set of similar non-compliant items and to provide recommendations on the noncompliance in the notification. The past exception handlings can include actions of associated agents, such as borrowers of mortgages. The non-compliant items can include insurance items that are not compliant with one or more governmental parameters and guidelines, such as federal rules. The ITAC system then automatically sends the reminder letters to the borrowers until the noted deficiencies are resolved (416). The ITAC system may review and track actions of associated agents, such as borrowers of mortgages to determine whether the actions achieve compliance. Any non-compliant items that remain and that are not resolved by the borrower may be force-placed by the risk module (418).

Figure 5:
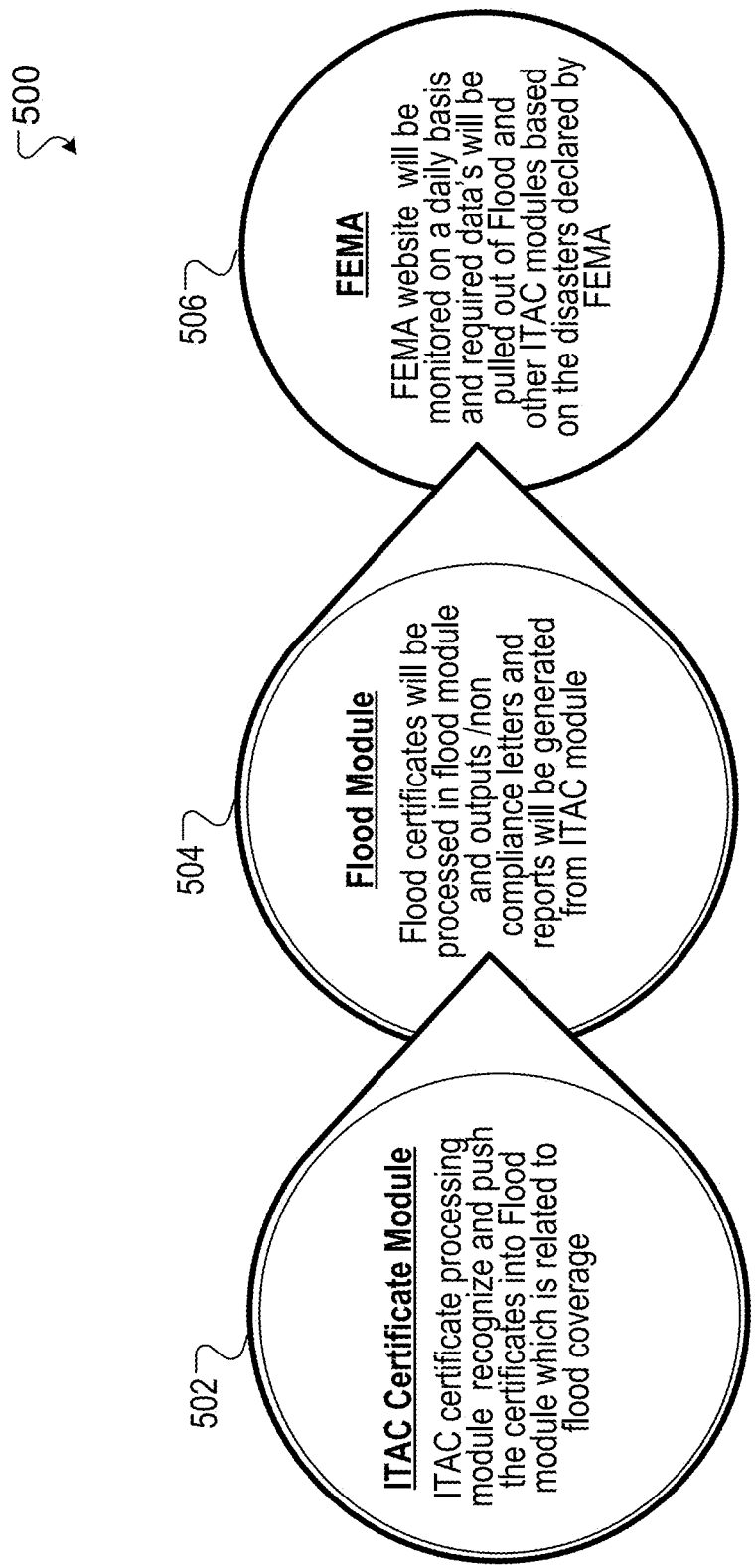
FIG. 5 is a schematic diagram illustrating an example of an input/output relationship in a system that automatically reviews, tracks, and enables compliance in the context of risk protection policies.

FIG. 5 is a schematic illustration of an example of a relationship between the risk insurance module and other modules and systems in the overall compliance and review system. In the example relationship 500 of FIG. 5, an ITAC Certificate Module 502 recognizes and pushes risk protection certificates into a Risk Module 504 to analyze compliance with one or more rules related to risk coverage.

The Risk Module 504 processes the risk protection certificates and outputs non-compliance letters for any items that are not in compliance with the rules and regulations. The Risk Module 504 may also generate reports and letters regarding the detected non-compliant items in the risk protection certificates.

The Risk Module 504 may obtain the rules and regulations, for example, from an external server, such as FEMA server 506. In this example, the Risk Module 504 monitors the FEMA website on a daily basis, and pulls relevant data from the Risk Module 504 and ITAC Module 502 based on disasters declared by FEMA.

Figure 6:
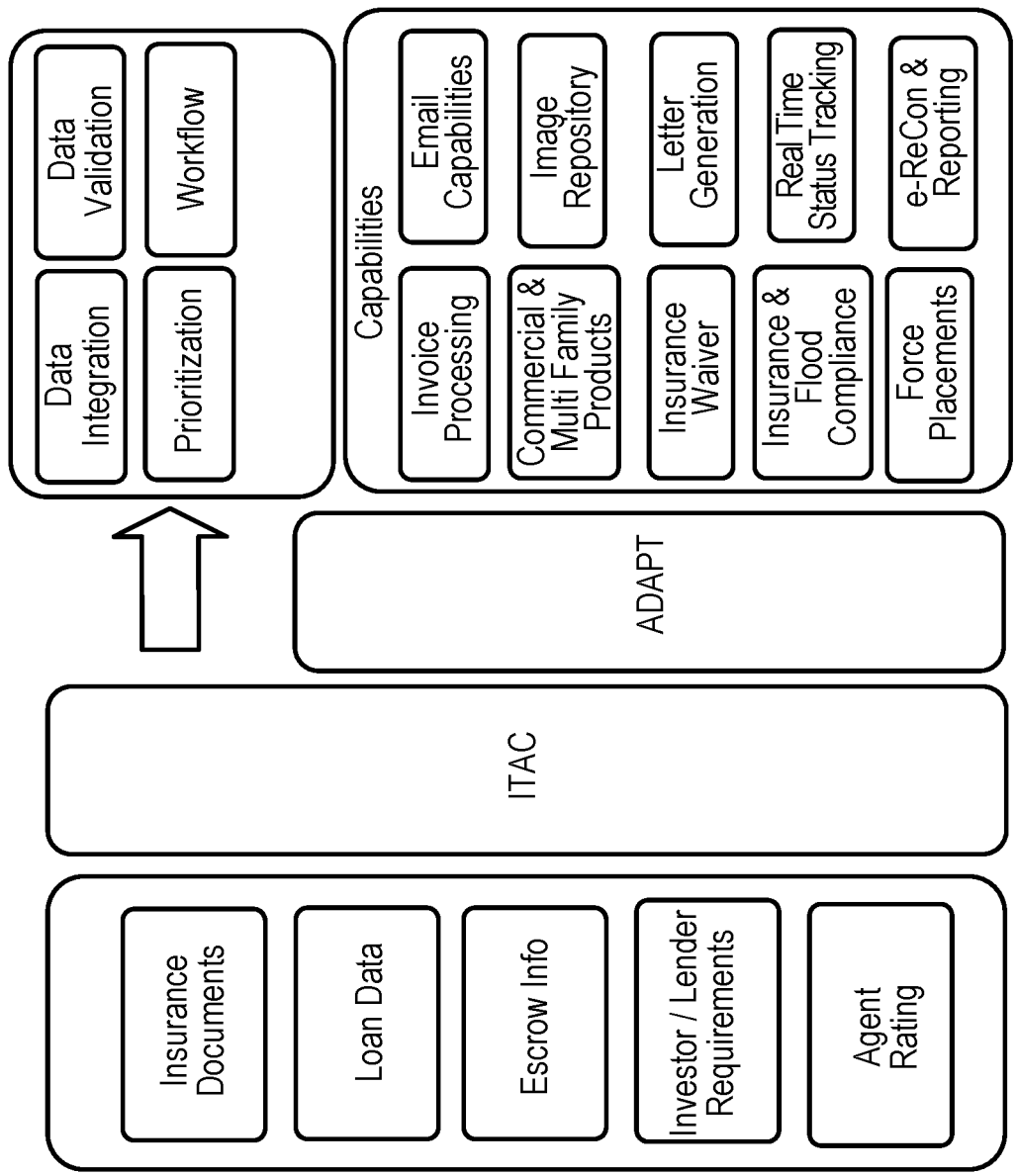
FIG. 6 is a schematic diagram illustrating an example of a framework and capabilities of a system that automatically reviews, tracks, and enables compliance in the context of risk protection policies.

FIG. 6 depicts an example of a framework and capabilities of a system that tracks compliance of a risk protection certificate. In the example framework 600 of FIG. 6, an ITAC system is built on an Architecture for Dynamic Allocation and Performance Tracking (ADAPT) framework. The ADAPT framework may provide a flexible platform that enables automated tracking of performance of various types of systems and processes. The ITAC system may use various types of information as input, such as insurance documents, loan data, escrow information, investor/lender requirements, and/or agent ratings. The ITAC system may perform different analytics to perform compliance review of the insurance documents, such as data integration, data validation, prioritization, and/or workflow processing. In doing so, the ITAC system may be modified to handle risk protection certificates. For example, the ITAC system may be modified with capabilities such as handling invoice processing, commercial and multi-family products, insurance waivers, insurance and risk compliance, force placements, email capabilities, image repository, letter generation, real-time status checking, and/or electronic recon and reporting of compliance review results.

FIGS. 7 to 9 depict examples of graphical user interfaces (GUIs) that may be used for performing compliance review and tracking.

FIG. 7 depicts an example of a user input screen that may be provided by a risk module to enable a user to enter compliance results for one or more parameters of a risk protection certificate. In the example interface 700 of FIG. 7, various parameters may be available to analyze compliance of the risk protection certificate, such as a risk zone, a risk protection policy period, a risk protection limit, a risk protection deductible, or a lapse in risk protection coverage. Other parameters may include a carrier rating, a deductible, and/or other parameters related to analyzing compliance of the risk protection certificate with respect to one or more rules.

FIG. 8 depicts an example of a user output screen that indicates compliance of one or more parameters of a risk protection certificate. In the example output 800 of FIG. 8, the risk module outputs the evaluation results of different parameters and comments from the reviewers. The output of the risk module may be, for example, a HyperText Markup Language (HTML) document that is displayed on a computer screen, such as a mobile device of an employee of a mortgage issuer, or an agent/borrower.

FIG. 9 depicts an example of a user input screen for generating a force-placed risk protection certificate. The risk module may generate a force-placed risk protection certificate, for example, if a borrower consistently fails to remedy deficiencies to comply with risk insurance rules or regulations. In some implementations, the system may charge the borrower a premium associated with the force-placed risk protection certificate. In the example input 900 of FIG. 9, the risk module may prompt a user to input various information regarding the force-placed risk protection certificate, such as a term of the policy and identification information for the loan, such as a loan number, associated with the risk protection. Based on the inputs, the risk module may automatically generate a risk protection certificate for the identified loan that complies with the applicable risk-insurance rules and regulations.

Figure 10:
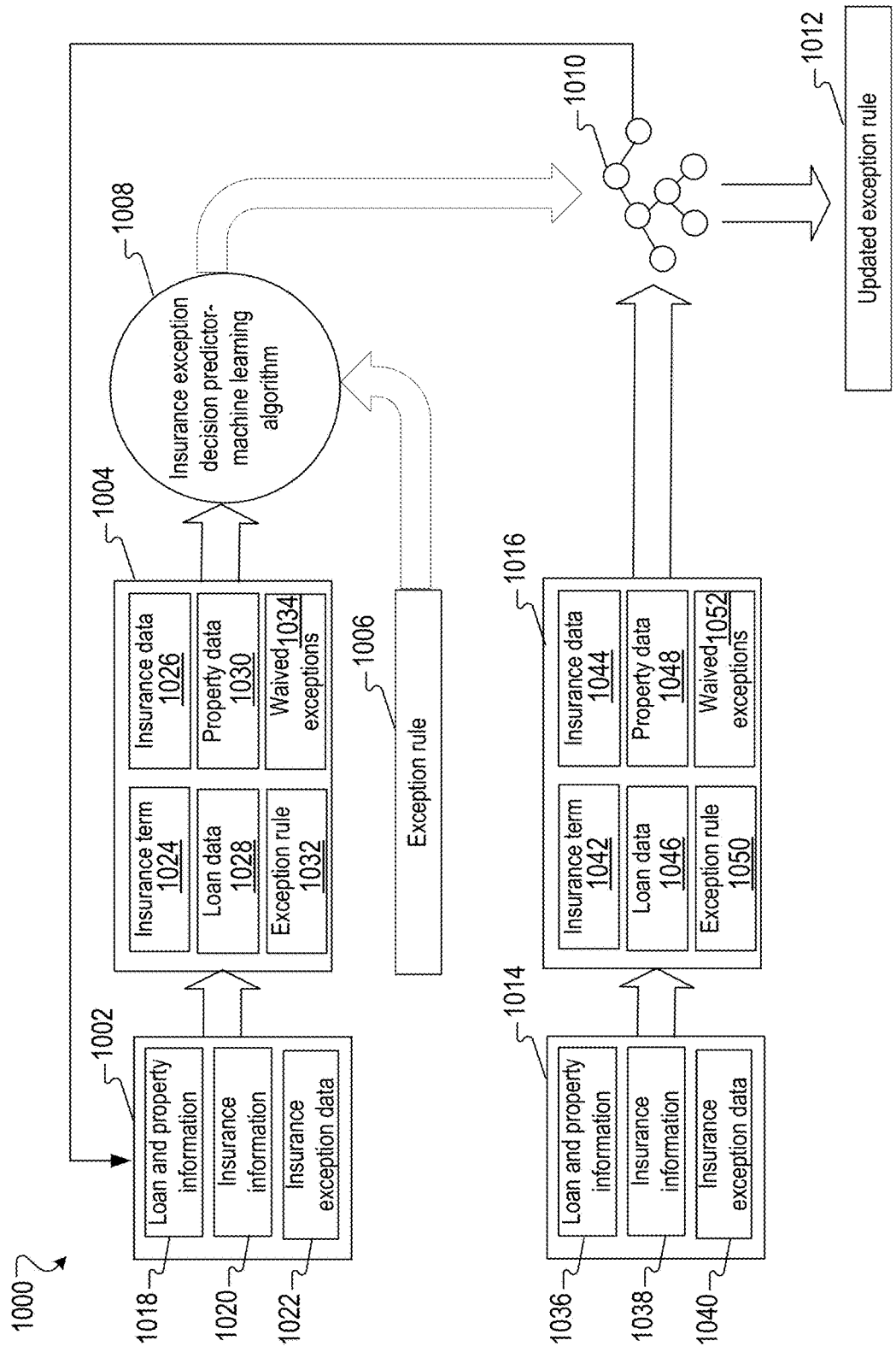
FIGS. 10 and 11 are examples of system architectures in accordance with implementations of the present disclosure.

FIG. 10 illustrates an example of a decision service architecture 1000 that can be executed in implementations of the present disclosure. In some implementations, the example decision service architecture 1000 is provided to continuously analyze data and update the exception rules to decrease human intervention on the exceptions being identified and flagged by the engine. The example decision service architecture 1000 includes a training data module 1002, a feature matrix 1004, an exception rule 1006, a machine learning algorithm 1008, an exception decision model 1010, an updated exception rule 1012, an input data module 1014, and a feature matrix 1016. The training data module 1002 includes training data, such as loan and property information 1018, insurance information 1020, and insurance exception data 1022. The training data 1002 can be stored in a database and can be sent to the feature matrix 1004 in response to a query received from the exception decision model 1010. The feature matrix 1004 includes insurance term 1024, insurance data 1026, loan data 1028, property data 1030, exception rule 1032, and waived exceptions 1034. The feature matrix 1004 can be composed by processing data received from the training data module 1002. The feature matrix 1004 generates a data matrix to be used as input by the machine learning algorithm 1008. The machine learning algorithm 1008 is configured to process the feature matrix based on the exception rule 1006 and generates an output that is transmitted to the exception decision model 1010. The machine learning algorithm 1008 includes an insurance exception decision predictor.

The updated exception rule 1012 can include a portion of the exception rule and at least a modified portion of the exception rule 1006. The input data module 1014 includes input data, such as loan and property information 1036, insurance information 10238, information 1038 and insurance exception data 1040. The feature matrix 1016 includes insurance term 1042, insurance data 1044, loan data 1046, property data 1048, exception rule 1050, and waived exceptions 1052. The feature matrix 1016 can be composed by processing data received from the input data module 1014. The feature matrix 1016 generates a data matrix to be used as input by the exception decision model 1010. The output of the exception decision model 1010 is compared to the exception rule 1006 and based on the differences, an updated exception rule 1012 is generated and stored. More details about the functions of the decision service architecture 1000 are described with reference to FIG. 15.

Figure 11:
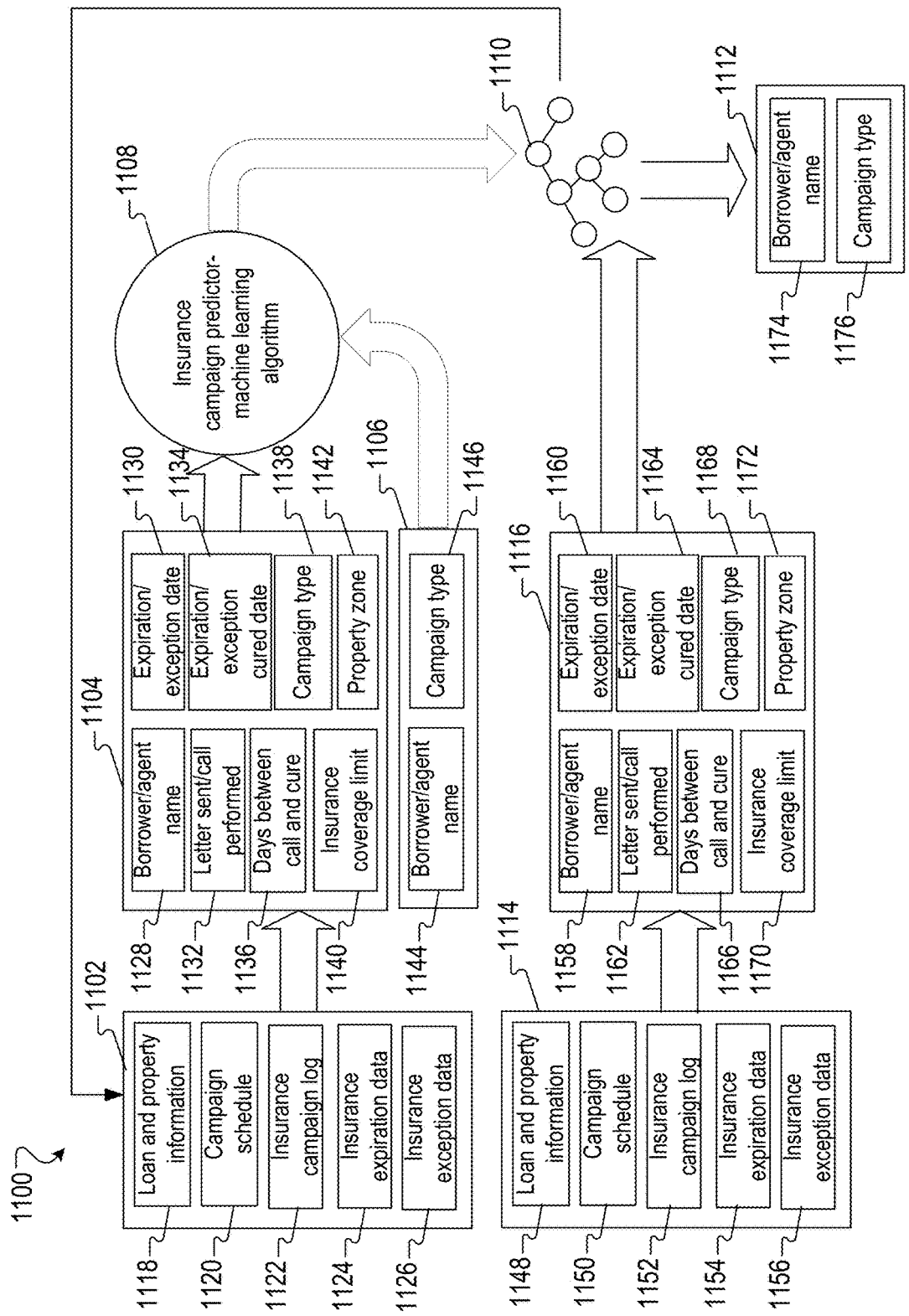

FIG. 11 illustrates an example of a campaign planner architecture 1100 that can be executed in implementations of the present disclosure. In some implementations, the example campaign planner architecture 1100 is provided to continuously analyze data and predict the best campaign cycle to be followed for sending the letters or making the calls to get a renewed/updated insurance policy from each borrower/insurance agent.

The example campaign planner architecture 1100 includes a training data module 1102, a feature matrix 1104, a label module 1106, a machine learning algorithm 1108, a campaign planner model 1110, a predicted campaign cycle 1112, an input data module 1114, and a feature matrix 1116. The training data module 1102 includes training data, such as loan and property information 1118, campaign schedule 1120, insurance campaign log 1122, insurance expiration data 1124, and insurance exception data 1126. The training data 1102 can be stored in a database and can be sent to the feature matrix 1104 in response to a query received from the campaign planner model 1110. The feature matrix 1104 includes borrower/agent name 1128, expiration/exception date 1130, letter sent/call performed 1132, expiration/exception cured date 1134, days between call and cure 1136, campaign type 1138, insurance coverage limit 1140, and property zone 1142. The feature matrix 1104 can be composed by processing data received from the training data module 1102. The feature matrix 1104 generates a data matrix to be used as input by the machine learning algorithm 1108. The machine learning algorithm 1108 is configured to process the feature matrix based on the labels (borrower/agent name 1144 and campaign type 1146) received from the label module 1106. The machine learning algorithm 1108 is configured to generate an output that is transmitted to the campaign planner model 1110. The machine learning algorithm 1108 includes an insurance campaign predictor.

The predicted campaign cycle 1112 can include a scheduled timeline for renewing an insurance policy for a particular borrower/agent identified by borrower/agent name 1174 and a particular campaign type 1176. The input data module 1114 includes input data, such as loan and property information 1148, campaign schedule 1150, insurance campaign log 1152, insurance expiration data 1154, and insurance exception data 1156. The feature matrix 1116 includes borrower/agent name 1158, expiration/exception date 1160, letter sent/call performed 1162, expiration/exception cured date 1164, days between call and cure 1166, campaign type 1168, insurance coverage limit 1170, and property zone 1172. The feature matrix 1116 can be composed by processing data received from the input data module 1114. The feature matrix 1116 generates a data matrix to be used as input by the campaign planner model 1110. The output of the campaign planner model 1110 is compared to the current date and based on the time differences, an updated campaign cycle 1112 can be recalculated. More details about the functions of the campaign planner architecture 1100 are described with reference to FIG. 16.

Figure 12:
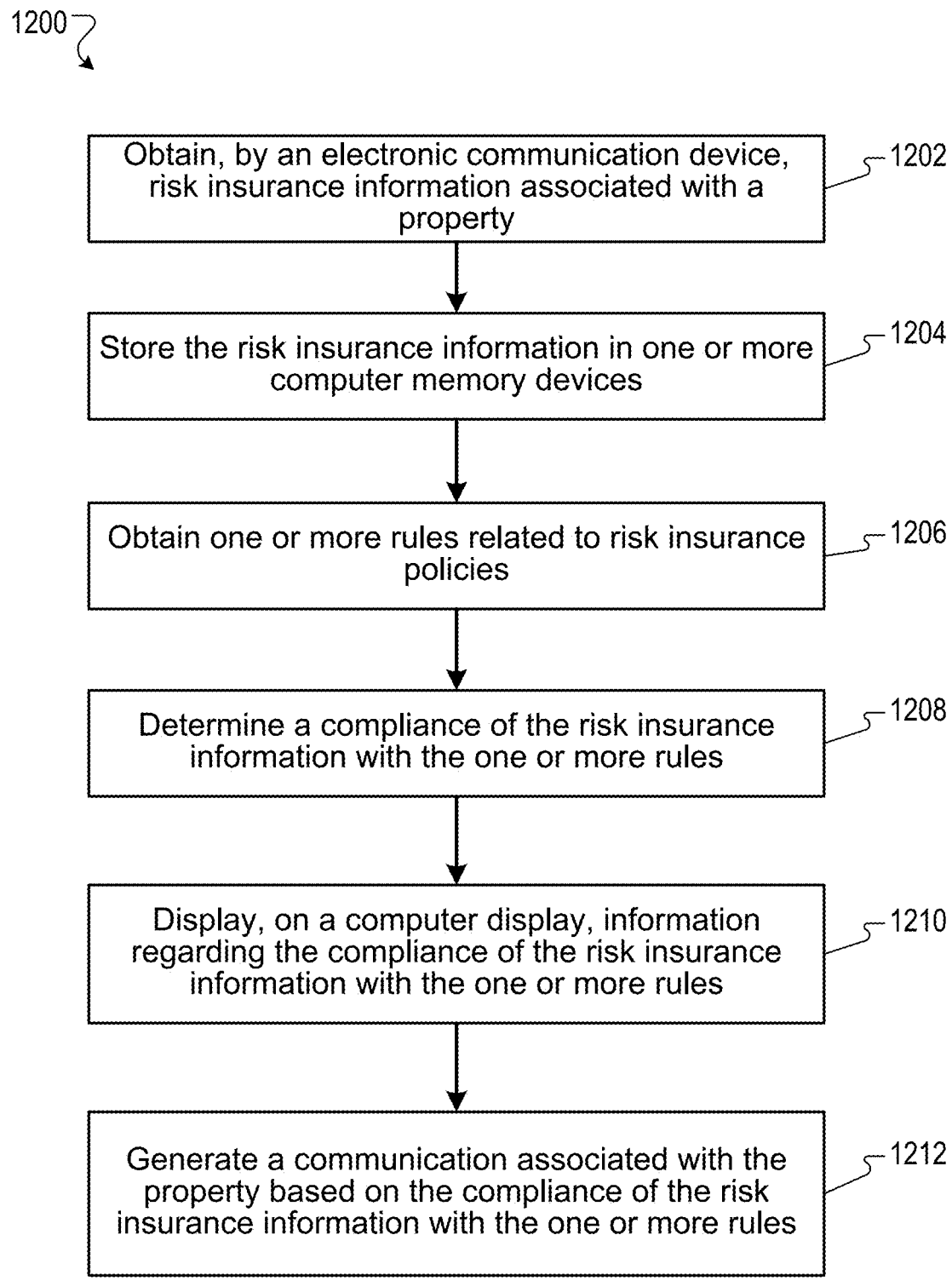
FIGS. 12 to 16 are flow charts illustrating example process that can be executed in accordance with implementations of the present disclosure.
Figure 13:
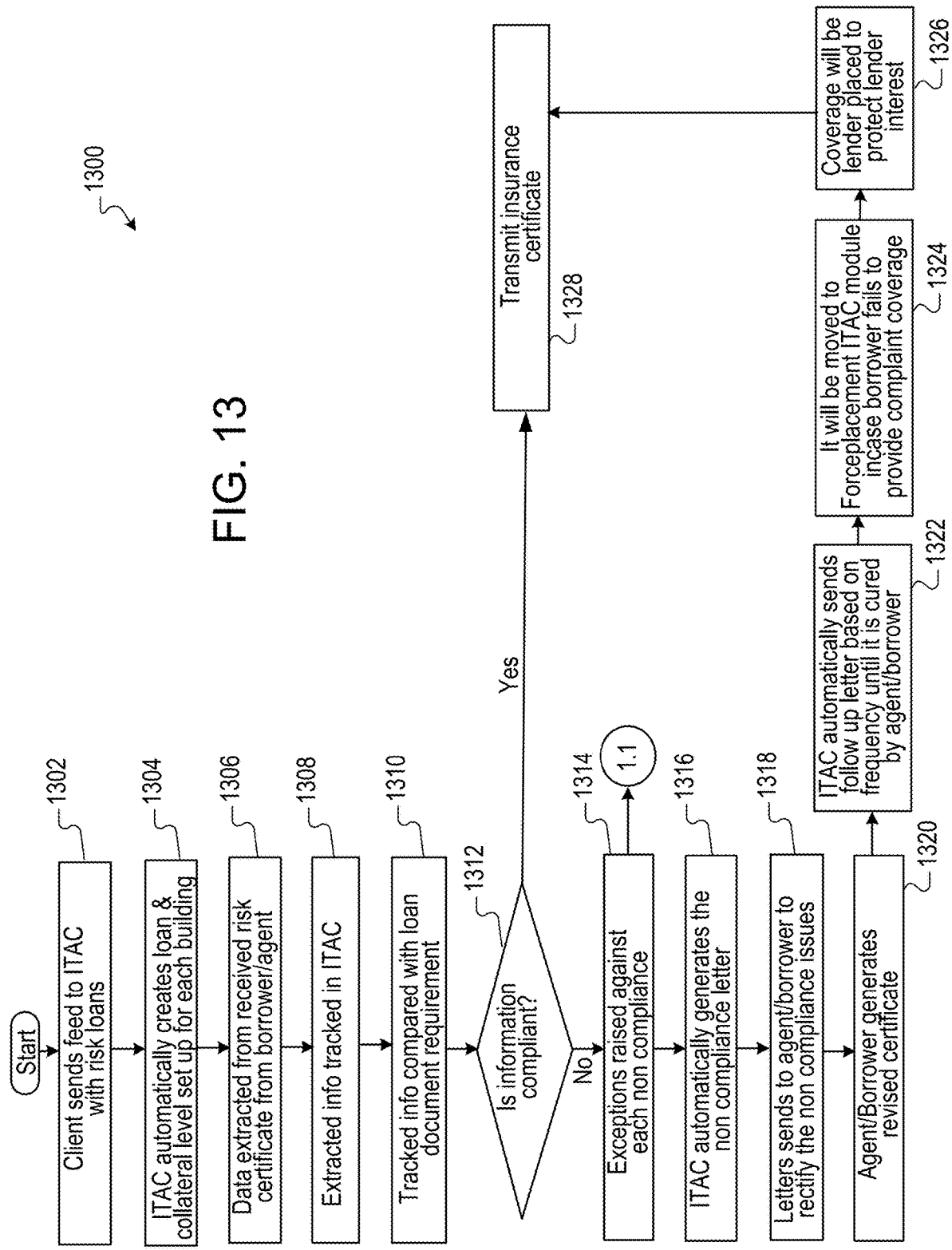
Figure 14:
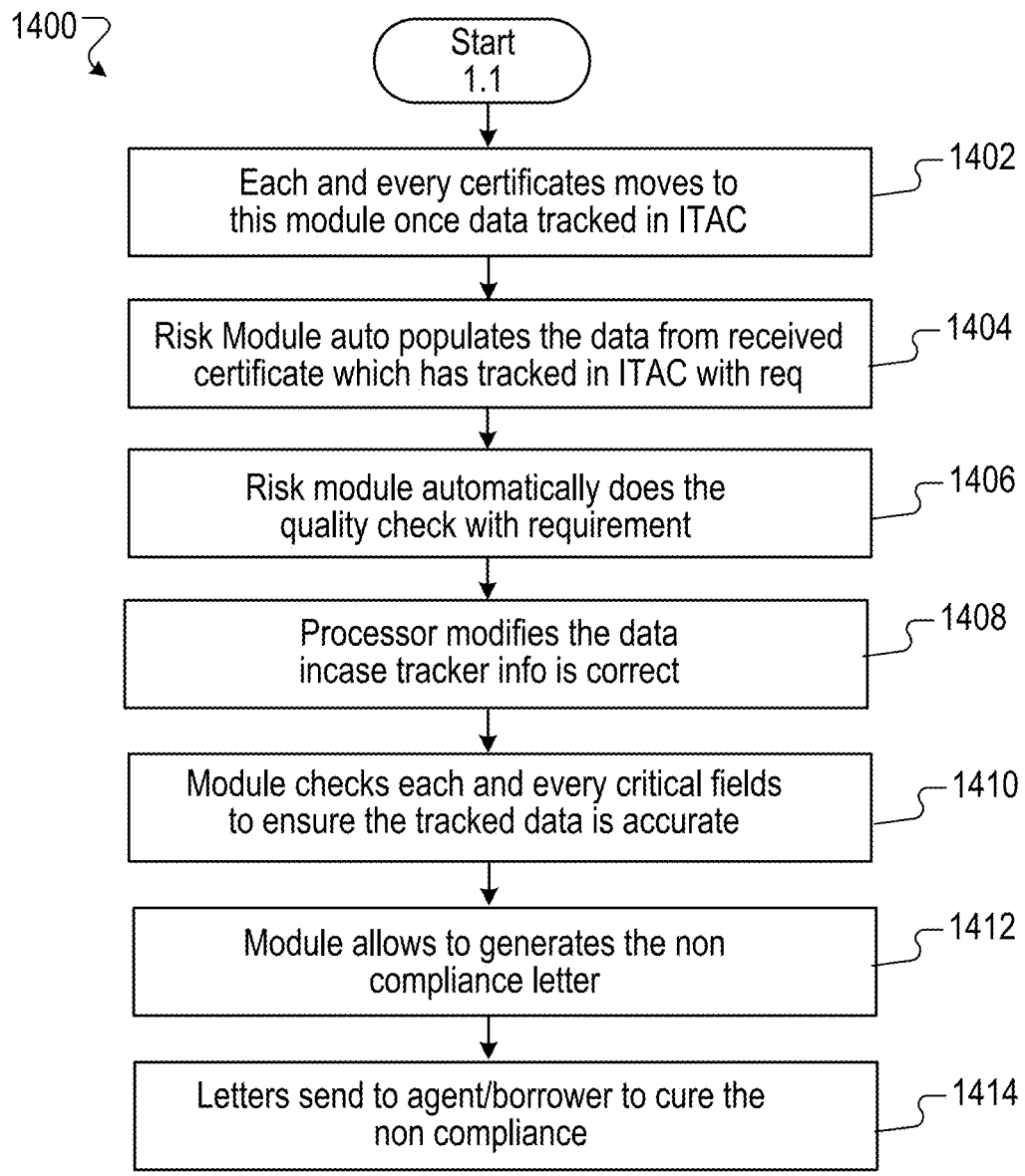

FIGS. 12 to 14 are flow charts depicting examples of performing automated compliance review and tracking of risk protection certificates.

FIG. 12 depicts an example process 1200 of reviewing, tracking, and enabling compliance. In some implementations, the system obtains, by the one or more processors in conjunction with an electronic communications device, a risk protection certificate information associated with a property (1202). The system stores the risk protection certificate information in one or more computer memory devices (1204) and obtains one or more rules that are relevant to the risk protection certificate information (1206). The system then automatically determines a compliance status of the risk protection certificate information with the one or more rules (1208).

The system determining the compliance status can include a case-based decision engine, a dominance-based decision engine, a multi-variate adaptive regression splines engine, a neural network decision engine, or a combination of decision engines. To determine the compliance status, the system uses as input information related to at least one of a risk zone, a risk protection policy period, a risk protection limit, a risk protection deductible, or a lapse in risk protection coverage. Obtaining the risk protection certificate information may include performing automated recognition of the risk protection certificate information based on one or more naming conventions associated with risk protection policies. In some implementations, obtaining one or more rules that are relevant to the risk protection certificate information involves connecting to one or more remote computer servers and obtaining, from the one or more remote computer servers, information related to a government law or a government regulation relevant to the risk protection certificate information.

Determining a compliance status of the risk protection certificate information with the one or more rules may be performed in a number of ways. For example, the system may use information related to a government law or government regulation, such as risk hazard data that indicates risk zones, and compare a geographic location of the property with the risk zones. In some implementations, the system may determine a designated risk protection premium or a designated risk protection rate for the property based on comparing a geographic location of the property with the risk zones. Compliance may then be determined by analyzing whether the risk protection certificate information complies with the designated risk protection premium or the designated risk protection rate for the property.

In some implementations, determining a compliance status of the risk protection certificate information with the one or more rules involves determining whether the property complies with a requirement to purchase risk protection as a result of receiving risk-related financial assistance from a federal government.

In some examples, determining a compliance status of the risk protection certificate information with the rules involves automatically identifying relevant parameters of the risk protection certificate information, and determining whether the parameters satisfy the rules. In such implementations, automatically identifying one or more parameters of the risk protection certificate information may involve automatically determining, based on the risk protection certificate information for the property, parameters related to a risk zone, a risk protection policy period, a risk protection limit, a risk protection deductible, or a lapse in risk protection coverage.

In some implementations, the system may determine that the property is not associated with a valid risk protection certificate at all and may thus determine non-compliance.

The system may display, on a display of a mobile electronic device, a graphical user interface displaying information regarding a progress of determining a compliance status of the risk protection certificate information with the one or more rules. In some implementations, the system may obtain a template letter from an electronic storage device, process the template letter to indicate the result of determining the compliance status of the risk protection certificate, and automatically generate a postal transmission of the processed template letter to the contact information associated with the property, indicating the result of determining the compliance status of the risk protection certificate.

The system may also obtain updated risk protection certificate information associated with the property and determine that the updated risk protection certificate information does not comply with the one or more rules.

The system may, in some implementations, analyze compliance for a plurality of properties, and in doing so, establish a prioritized ordering of analyzing risk protection certificate information for the plurality of properties. The system may determine the prioritized ordering by, for example, performing predictive analytics that identifies one or more high-risk properties from among the plurality of properties, and analyzing those high-risk properties with higher priority.

The system generates a notification indicating the results of the compliance analysis (1210). For example, the system transmits, by an electronic communication device and based on contact information associated with the property, a result of determining the compliance status of the risk protection certificate information with the one or more rules.

In some implementations, the system may establish an electronic communication session with an electronic device associated with the property, and transmit, through the electronic communication session and to the electronic device associated with the property, the result of determining the compliance status of the risk protection certificate information with the one or more rules (1212). As another example, the system may transmit information indicating at least one deficiency of the risk protection certificate information with respect to the one or more rules and at least one action that would satisfy the at least one deficiency.

In some implementations, the communication or the processing of an additional set of rules can provide additional information indicating that the non-compliant information constitutes an exception. In response to identifying the exception, the system may generate an exception waiver and, possibly, an insurance policy, as described with reference to FIG. 15. In response to identifying the non-compliance, the system may generate a force-placed risk protection certificate for the property. The system can generate the force-placed risk protection certificate for the property by determining a risk protection premium for the property and generate a risk protection certificate for the property based on the risk protection premium. If the system later determines to cancel the force-placed risk protection certificate, the system may automatically generate a reimbursement for the risk protection premium associated with the force-placed risk protection certificate.

FIG. 13 depicts another example of risk insurance tracking and compliance. In the example process 1300 of FIG. 13, the ITAC system receives a feed from a client regarding risk insurance policies associated with one or more mortgage loans (1302). The ITAC system automatically creates loan and collateral level information for each property associated with the mortgage loan, such as a building (1304). The ITAC system extracts data from the received risk certificates (1306), tracks the extracted information (1308), and compares the tracked information with one or more rules or requirements associated with the loan (1310). Information is processed to verify compliance with one or more rules and requirements (1312). The compliance verification process can be similar to the process 1008, described with reference to FIG. 10. If the ITAC system determines that the risk certificate complies with the requirements, then an insurance certificate is transmitted (1328). If the ITAC system determines that the information is not compliant, the ITAC system indicates, such as by raising exceptions, the non-compliant items (1314). Further details of the compliance review, in the context of risk insurance module are presented in FIG. 14.

Based on the non-compliant items detected in operation 1314, the ITAC system automatically generates a notification (e.g., non-compliance letter) (1316) and sends the non-compliance letters to the agent/borrower, including recommended actions to rectify the non-compliance (1318). The agent/borrower may revise and send an updated risk protection certificate (1320). If the agent/borrower continues to fail to rectify the non-compliance, then the ITAC system continues to send follow-up letters, which may increase in frequency, until the non-compliance is cured by the agent/borrower (1322). After a sufficient number of repeated follow-up letters, the ITAC system may generate a force-placed risk protection certificate for the agent/borrower (1324), and the force-placed certificate may be lender-placed to protect the lender's interests (1326). The issued forced-placed certificate can be transmitted to the insured entity (1328).

FIG. 14 depicts further details of automatically tracking and reviewing compliance in the context of a risk insurance module. In the example process 1400 of FIG. 14, the risk insurance module performs compliance review on risk certificates that it receives (1402). The risk module automatically extracts data from the received certificates and retrieves applicable rules or requirements (1404). The risk module automatically performs quality checks of the data with respect to the requirements (1406). In some implementations, a processor may edit and modify the extracted data to ensure that the data is correct (1408) and the risk module may additionally check certain critical fields to ensure that the data is accurate (1410). The risk module may enable generation of a non-compliance letter to indicate any non-compliant items that the module detected in the certificates (1412), and send the letter to the agent/borrower (1414).

Figure 15:
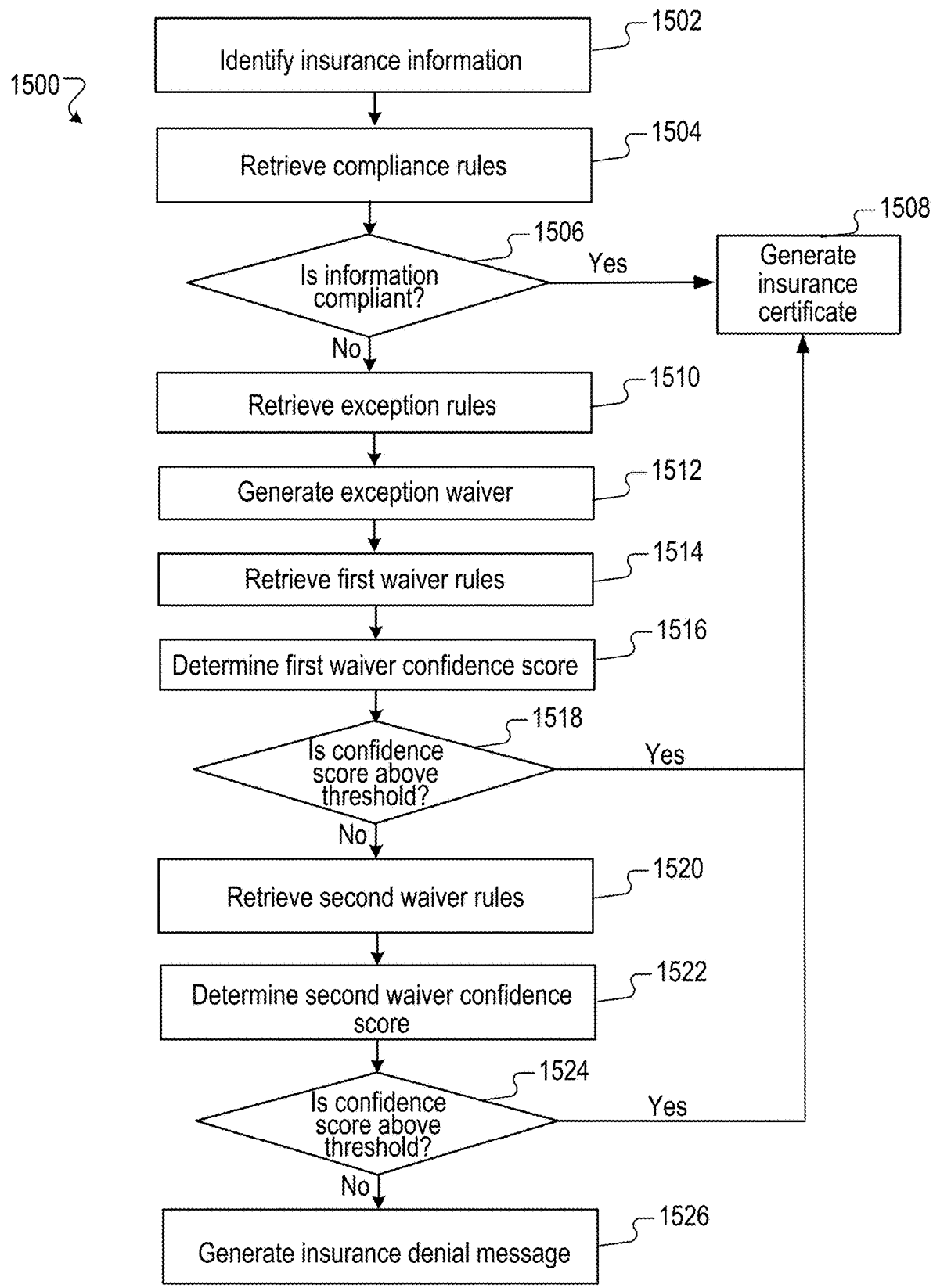

FIG. 15 depicts an example process 1500 that can be executed in implementations of the present disclosure. In some implementations, the example process 1500 is provided using one or more computer-executable programs executed by one or more computing devices (e.g., an insurance module implemented in client devices 102, 104 or computer servers 116, 122 of FIG. 1). In the example process 1500 of FIG. 15, the insurance module identifies an insurance information (1502). The insurance information can include a property location, an insurance policy period, an insurance limit, an insurance deductible, and a lapse in insurance coverage. The risk module automatically extracts data from the received certificates and retrieves applicable rules and/or requirements from one or more internal and/or external databases (1504). The rules can include a government law and/or a government regulation related to the insurance information. The insurance module automatically processes the data with respect to rules and/or requirements to determine whether the information is compliant (1506). If the information is compliant, an insurance certificate is generated (1508).

If the information is not compliant, one or more exception rules are retrieved from one or more internal and/or external databases (1510). The exception rules define the association between two or more parameters of the insurance certificate, which in a particular combination can enable the issuance of an exception waiver. The parameters can include risk type, risk zones, coverage value (e.g., as percentage), current property value, age of property, changes associated with the property, reliability score of the insurer, reliability score of the insured entity, protection features that decrease a risk, number of insurances, exception term (e.g., duration prior to expiration), exception priority, and/or any other parameters that can be included in the insurance policy. In some implementations, the exception rules define a penalty that is associated with a deviation from insurance rules. In some implementations, the exception can be associated with a coverage of less than 100% of estimated value of the insured property. For example, additional information can indicate that the property value depreciated to a value (e.g., 90%) that is below the estimated value, which can enable the exception waiver. In some implementations, the exception can be associated with an additional protection factor that decreases a risk to be covered by the insurance. For example, an insured property that is within a risk zone can have a nearby dam, a drainage system, and/or one of more additional construction features that decrease the risk of risking. In some implementations, the exception can be associated with a reliability of the insurer and/or the insured entity. In some implementations, the exception can be associated with the existence of multiple insurance policies that cover different risks associated to the insured entity, where the exception waiver is enabled to avoid enforcing overlapping insurances covering the same risk for to the insured entity.

The insurance module can process the data based on the exception rules to generate an exception waiver (1512). The exception waiver can include one or more waiver parameters that define the waived non-compliance, waiver supporting information (e.g., explanation of waiver granting), an exception coverage percentage, and an expiration date of the exception waiver. A first waiver model including a first set of waiver rules can be retrieved (1514). The first waiver model can be configured to process one or more of exception waiver parameters using one or more rules of the first set of waiver rules. The exception waiver is processed based on the first waiver model to determine a first waiver confidence score (1516).

The first waiver confidence score can be compared to a first predetermined threshold (1518). The first predetermined threshold can be based on the type of insurance, a type of insurer (e.g., industry branch) and/or other parameters. If the first waiver confidence score exceeds the first predetermined threshold, an insurance certificate is generated (1508). If the first waiver confidence score is below the first predetermined threshold, a second waiver model including a second set of waiver rules is retrieved from one or more internal and/or external databases (1520). The second set of waiver rules is different from the first set of waiver rules. For example, the first and second sets of waiver rules can correspond to different types of exceptions. The types of exceptions can include financial exceptions, geographical exceptions, security exceptions, event associated exceptions or others. The exception waiver is processed based on the second waiver model to determine a second waiver confidence score (1522).

The second waiver confidence score can be compared to a second predetermined threshold (1524). The second predetermined threshold can be based on the type of insurance, type of insured entity (e.g., industry branch) and/or other parameters. If the second waiver confidence score exceeds the second predetermined threshold, an insurance certificate is generated (1508). If the second waiver confidence score is below the predetermined threshold, an insurance denial notification is generated (1526). For example, the insurance module can generate a non-compliance letter to indicate any non-compliant items that the module detected in the certificates and send the letter to the entities associated with the insurance information (e.g., insurance applicant). In some implementations, the insurance denial notification can include recommended actions to rectify the non-compliance and a time interval for executing the recommended actions.

Figure 16:
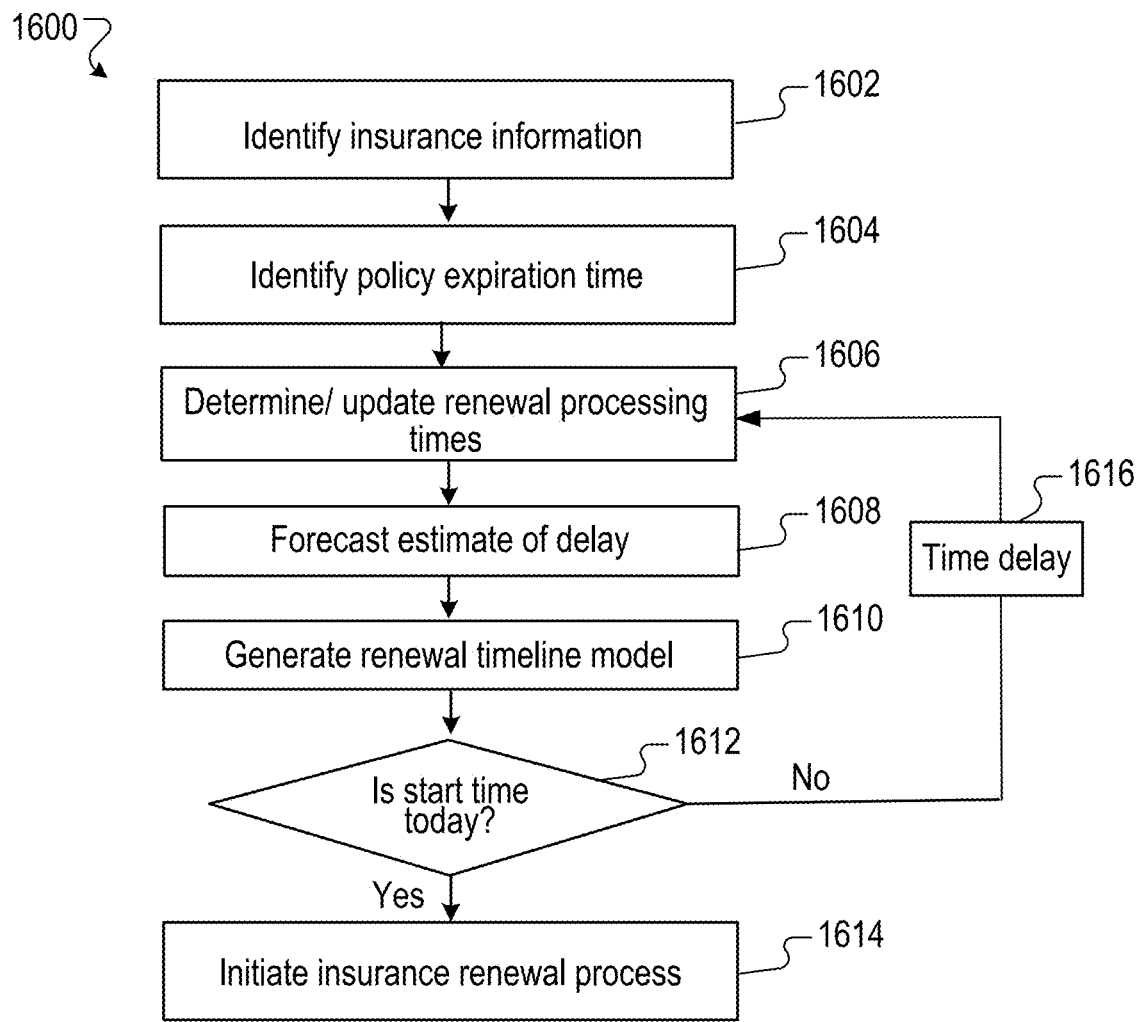

FIG. 16 depicts an example process 1600 that can be executed in implementations of the present disclosure. In some implementations, the example process 1600 is provided using one or more computer-executable programs executed by one or more computing devices (e.g., an insurance module implemented in client devices 102, 104 or computer servers 116, 122 of FIG. 1). In the example process 1600 of FIG. 16, the risk insurance module the insurance module identifies an insurance information (1602).

The insurance module automatically extracts data to determine a policy expiration time (1604). The insurance module processes the insurance information to determine associated policy renewal requirements. The insurance module uses the policy renewal requirements to retrieve renewal processing information. The renewal processing information can include data extracted from databases that log processing times of multiple renewal processes and statistical data involving processing times of multiple renewal processes (e.g., average times, variation between months and years). The insurance module uses the renewal processing information to determine estimates of renewal processing times (1606).

The insurance module generates an estimate of policy renewal delay based on the estimates of the renewal processing times (1608). For example, the estimate of policy renewal delay can indicate that based on current or statistical trends of renewal processing times it would take a particular number of days, weeks or months to complete the renewal process. The insurance module generates a renewal timeline model based on the estimate of the policy renewal delay (1610). The renewal timeline model can include a proposed startup date for each operation of the renewal process and a recommended sequence of operations defining the renewal process. The startup dates included in the timeline model can be processed to determine whether any of the startup dates corresponds to the current date or fall within an interval associated with the current date (e.g., a predetermined number of days before the current date) (1612). If any of the startup dates corresponds to the current date or fall within an interval associated with the current date, the insurance renewal process is initiated (1614). If none of the startup dates corresponds to the current date or fall within an interval associated with the current date, the process 1600 returns to updating the renewal processing times (1606) after a time delay (1616). The time delay can be a predetermined time delay (e.g., a particular number of days, weeks or months). In some implementations, the time delay can be a variable parameter based on current or statistical trends of renewal processing times. In some implementations, the time delay can be associated to the interval associated with the current date, such that the time delay is equal or longer than the interval associated with the current date.

Figure 17:
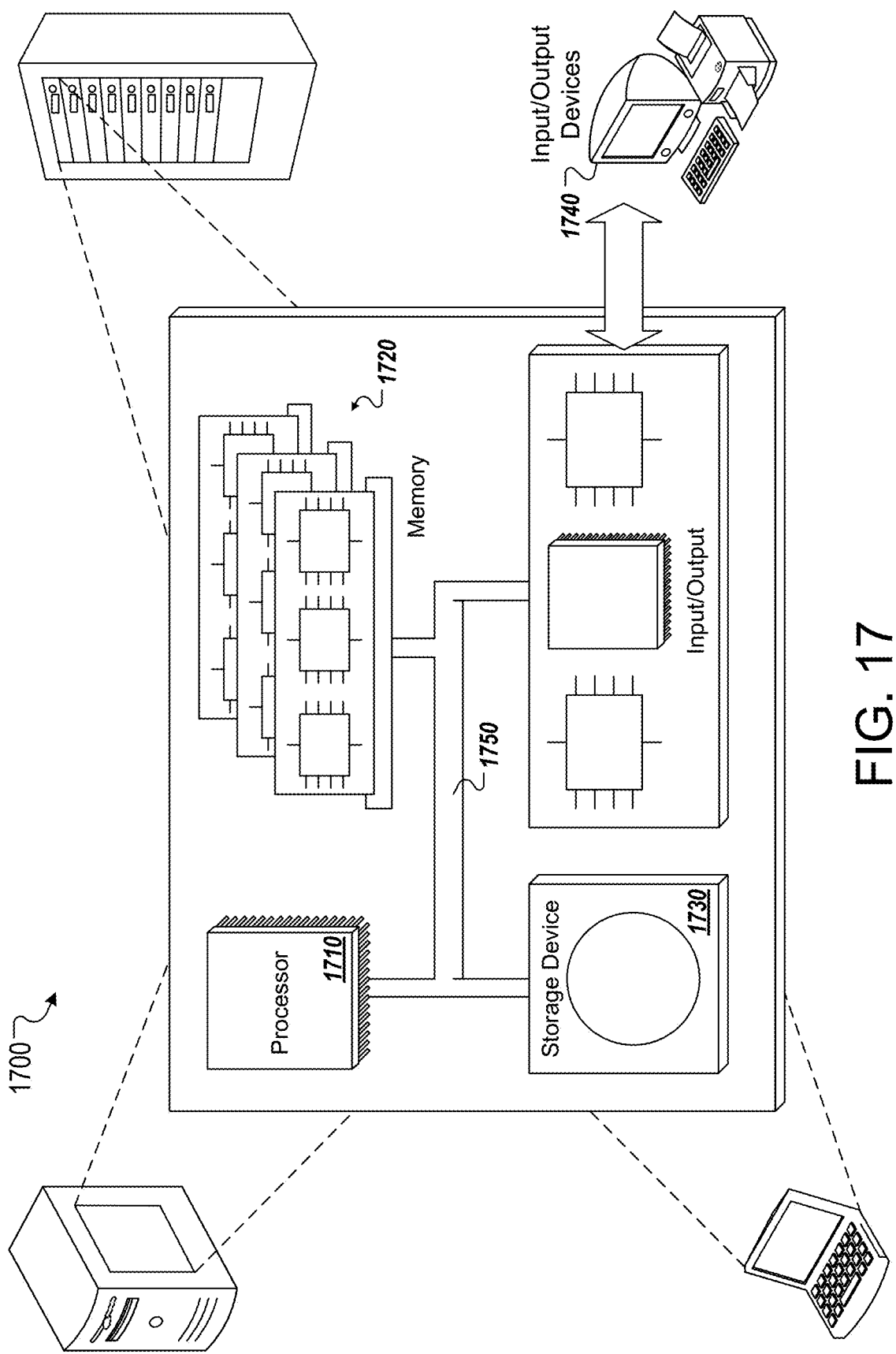
FIG. 17 is a schematic diagram of an example of a computer system that can be used for the operations described in association with the techniques described herein.

FIG. 17 is a schematic diagram of an example of a computer system that can be used for the operations described in association with the techniques described herein.

The system 1700 includes a processor 1710, a memory 1720, a storage device 1730, and an input/output device 1740. Each of the components 1710, 1720, 1730, and 1740 are interconnected using a system bus 1750. The processor 1710 is capable of processing instructions for execution within the system 1700. In one implementation, the processor 1710 is a single-threaded processor. In another implementation, the processor 1710 is a multi-threaded processor. The processor 1710 is capable of processing instructions stored in the memory 1720 or on the storage device 1730 to display graphical information for a user interface on the input/output device 1740.

The memory 1720 stores information within the system 1700. In one implementation, the memory 1720 is a computer-readable medium. In one implementation, the memory 1720 is a volatile memory unit. In another implementation, the memory 1720 is a non-volatile memory unit. The processor 1710 and the memory 1720 may perform various types of data manipulation.

The storage device 1730 is capable of providing mass storage for the system 1700. In one implementation, the storage device 1730 is a computer-readable medium. In various different implementations, the storage device 1730 may be a floppy disk device, a hard disk device, an optical disk device, or a tape device. The storage device 1730 may store various types of data associated with the techniques described herein.

The input/output device 1740 provides input/output operations for the system 1700. In one implementation, the input/output device 1740 includes a keyboard and/or pointing device. In another implementation, the input/output device 1740 includes a display unit for displaying graphical user interfaces. The input/output device 1740 may be used to perform data exchange with other devices.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit for use in a computing environment.

Processors for the execution of a program of instructions include, by way of example, both general and special purpose microprocessors, and the sole processor or one of multiple processors of any kind of computer. Generally, a processor will receive instructions and data from a read-only memory or a random access memory or both. The elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

A number of implementations have been described. Nevertheless, it will be understood that various modifications may be made without departing from the spirit and scope of the disclosure. Accordingly, other implementations are within the scope of the following claims.

While this specification contains many specifics, these should not be construed as limitations on the scope of the disclosure or of what may be claimed, but rather as descriptions of features specific to particular implementations. Certain features that are described in this specification in the context of separate implementations may also be provided in combination in a single implementation. Conversely, various features that are described in the context of a single implementation may also be provided in multiple implementations separately or in any sub-combination. Moreover, although features may be described above as acting in certain combinations and even initially claimed as such, one or more features from a claimed combination can be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Thus, particular implementations have been described. Other implementations are within the scope of the following claims. For example, the actions recited in the claims may be performed in a different order and still achieve desirable results.

What is claimed is:

1. A computer-implemented method executed by one or more processors, the method comprising:
    receiving, by one or more servers that are associated with a mortgage-issuing institution that imposes a requirement on borrowers to possess flood protection certificates and that provide real-time status tracking of insurance certificates for mortgaged properties for different kinds of mortgage insurance and from a particular borrower among multiple borrowers that are associated with the mortgage-issuing institution, and through a feed that is associated with the particular borrower, insurance information associated with a property, in a received format as sent by the particular borrower;
    standardizing the insurance information associated with the property from the received format into a textual format according to one or more naming conventions;
    upon expiration of a scheduled timeline that is associated with the particular borrower, retrieving, by the one or more servers that are associated with the mortgage-issuing institution and from one or more servers that are associated with a government agency, one or more compliance rules related to the standardized insurance information;
    automatically determining, by the one or more servers that are associated with the mortgage-issuing institution, that the standardized insurance information in the textual format indicates a non-compliant status for at least one of the one or more compliance rules;
    in response to determining that the insurance information indicates the non-compliant status for at least one of the one or more compliance rules, processing, by the one or more servers that are associated with the mortgage-issuing institution, the standardized insurance information using one or more exception rule machine learning models that apply one or more exception rules that define an acceptable discrepancy between two or more terms of the standardized insurance information, to output an exception waiver comprising a plurality of waiver parameters that includes a parameter that identifies the at least one of the one or more compliance rules for which the non-compliant status was automatically determined;
    generating, by the one or more servers that are associated with the mortgage-issuing institution and using at least some of the standardized insurance information and the plurality of waiver parameters, a feature matrix that includes data for the standardized insurance information and the plurality of waiver parameters;
    providing, by the one or more servers that are associated with the mortgage-issuing institution and to a first machine learning-trained waiver model, the feature matrix that includes data for the standardized insurance information and the plurality of waiver parameters to cause the first machine learning-trained, waiver model to determine a first waiver confidence score for the standardized insurance information that is based on the one or more exception rules and that is associated with the property;
    receiving, by the one or more servers that are associated with the mortgage-issuing institution and from the first machine learning-trained waiver model, the first waiver confidence score for the standardized insurance information that is based on the one or more exception rules and that is associated with the property;
    determining that the first waiver confidence score fails to satisfy a first predetermined threshold;
    only after determining that the first waiver confidence score fails to satisfy the first predetermined threshold, providing, by the one or more servers that are associated with the mortgage-issuing institution and to a different, second machine learning-trained waiver model, the feature matrix that includes data for the standardized insurance information and the plurality of waiver parameters to cause the second machine learning-trained waiver model to determine a second waiver confidence score for the standardized insurance information that is based on the one or more exception rules and that is associated with the property;

receiving, by the one or more servers that are associated with the mortgage-issuing institution and from the second machine-learned waiver model, the second waiver confidence score for the standardized insurance information that is based on the one or more exception rules and that is associated with the property;

based on whether the second waiver confidence score satisfies a threshold confidence score, selectively force-placing, by the one or more servers that are associated with the mortgage-issuing institution, an insurance certificate for the property, and automatically transmitting, by an integrated email module of the one or more servers that are associated with the mortgage-issuing institution and in real time to the expiration of the scheduled timeline, a message indicating that the mortgage institution has force-placed the insurance certificate for the property using a pre-defined letter template;

receiving data identifying a human intervention taken in connection with the output of the one or more exception rule machine learning models;

generating, as training data for retraining the one or more exception rule machine learning models, (i) the data identifying the human intervention taken in connection with the output of the one or more exception rule machine learning models, (ii) the standardized insurance information, and (iii) the plurality of waiver parameters;

retraining the one or more exception rule machine learning models using the training data to apply one or more updated exception rules, to thereby decrease human intervention on exceptions being identified and flagged by the one or more servers that are associated with the mortgage-issuing institution over time; and using the retrained one or more exception rule machine learning models to process subsequently received, standardized insurance information by applying the one or more updated exception rules.

2. The method of claim 1, wherein the one or more exception rules comprise at least one of an exception coverage percentage, an exception type, an exception level, an exception term, and an exception priority.

3. The method of claim 1, wherein force-placing the insurance certificate comprises generating an insurance certificate for the property.

4. The method of claim 1, wherein the insurance information comprises at least one of a property location, an insurance policy period, an insurance limit, an insurance deductible, and a lapse in insurance coverage.

5. The method of claim 1, wherein the one or more compliance rules comprise a government law or a government regulation related to the insurance information.

6. The method of claim 5, wherein determining, based on the one or more compliance rules, whether the insurance information has the compliant status or the non-compliant status comprises:

determining, based on the government law or the government regulation, hazard data that indicates one or more risk zones;

comparing a geographic location of the property with the one or more risk zones;

determining a designated insurance premium or a designated insurance rate for the property based on comparing a geographic location of the property with the risk zones; and determining whether the insurance information complies with the designated insurance premium or the designated insurance rate for the property.

7. The method of claim 1, wherein determining that the insurance information has the non-compliant status comprises:

determining that the property does not comply with a requirement to purchase insurance as a result of receiving risk-related financial assistance from a federal government.

8. The method of claim 1, wherein determining that the insurance information has the non-compliant status comprises:

automatically identifying one or more parameters of the insurance information; and determining whether the one or more parameters of the insurance information satisfy the one or more compliance rules.

9. The method of claim 8, wherein automatically identifying one or more parameters of the insurance information comprises:

automatically determining, based on the insurance information for the property, one or more parameters related to a risk zone, an insurance policy period, an insurance limit, an insurance deductible, or a lapse in insurance coverage.

10. He method of claim 1, wherein determining that the insurance information has the non-compliant status comprises:

determining that the property is not associated with a valid insurance certificate.

11. The method of claim 1, further comprising displaying, on a display of a mobile electronic device, a graphical user interface displaying information regarding a progress of determining a compliance status of the insurance information with the one or more rules.

12. The method of claim 1, comprising:

transforming a template letter to indicate the result of determining the compliance status of the insurance information; and automatically generating a postal transmission of the transformed template letter indicating the non-compliant status of the insurance information, wherein the postal transmission is addressed to contact information associated with the property.

13. The method of claim 1, comprising:

transmitting information indicating at least one deficiency of the insurance information with respect to the one or more rules, and at least one corrective action associated with the at least one deficiency.

14. The method of claim 1, comprising:

determining, based on the one or more rules, an insurance premium for the property; and generating the insurance certificate for the property based on the insurance premium.

15. The method of claim 14, comprising performing predictive analytics to identify one or more high-risk properties from among the plurality of properties.

16. A system comprising:

one or more computers; and a computer-readable medium coupled to the one or more computers having instructions stored thereon which, when executed by the one or more computers, cause the one or more computers to perform operations comprising:

receiving, by one or more servers that are associated with a mortgage-issuing institution that imposes a requirement on borrowers to possess flood protection certificates and that provide real-time status tracking of insurance certificates for mortgaged properties for different kinds of mortgage insurance and from a particular borrower among multiple borrowers that are associated with the mortgage-issuing institution, and through a feed that is associated with the particular borrower, insurance information associated with a property, in a received format as sent by the particular borrower;

standardizing the insurance information associated with the property from the received format into a textual format according to one or more naming conventions;

upon expiration of a scheduled timeline that is associated with the particular borrower, retrieving, by the one or more servers that are associated with the mortgage-issuing institution and from one or more servers that are associated with a government agency, one or more compliance rules related to the standardized insurance information;

automatically determining, by the one or more servers that are associated with the mortgage-issuing institution, that the standardized insurance information in the textual format indicates a non-compliant status for at least one of the one or more compliance rules;

in response to determining that the insurance information indicates the non-compliant status for at least one of the one or more compliance rules, processing, by the one or more servers that are associated with the mortgage-issuing institution, the standardized insurance information using one or more exception rule machine learning models that apply one or more exception rules that define an acceptable discrepancy between two or more terms of the standardized insurance information, to output an exception waiver comprising a plurality of waiver parameters that includes a parameter that identifies the at least one of the one or more compliance rules for which the non-compliant status was automatically determined;

generating, by the one or more servers that are associated with the mortgage-issuing institution and using at least some of the standardized insurance information and the plurality of waiver parameters, a feature matrix that includes data for the standardized insurance information and the plurality of waiver parameters;

providing, by the one or more servers that are associated with the mortgage-issuing institution and to a first machine learning-trained waiver model, the feature matrix that includes data for the standardized insurance information and the plurality of waiver parameters to cause the first machine learning-trained, waiver model to determine a first waiver confidence score for the standardized insurance information that is based on the one or more exception rules and that is associated with the property;

receiving, by the one or more servers that are associated with the mortgage-issuing institution and from the first machine learning-trained waiver model, the first waiver confidence score for the standardized insurance information that is based on the one or more exception rules and that is associated with the property;

determining that the first waiver confidence score fails to satisfy a first predetermined threshold;

only after determining that the first waiver confidence score fails to satisfy the first predetermined threshold, providing, by the one or more servers that are associated with the mortgage-issuing institution and to a different, second machine learning-trained waiver model, the feature matrix that includes data for the standardized insurance information and the plurality of waiver parameters to cause the second machine learning-trained waiver model to determine a second waiver confidence score for the standardized insurance information that is based on the one or more exception rules and that is associated with the property;

receiving, by the one or more servers that are associated with the mortgage-issuing institution and from the second machine-learned waiver model, the second waiver confidence score for the standardized insurance information that is based on the one or more exception rules and that is associated with the property;

based on whether the second waiver confidence score satisfies a threshold confidence score, selectively force-placing, by the one or more servers that are associated with the mortgage-issuing institution, an insurance certificate for the property, and automatically transmitting, by an integrated email module of the one or more servers that are associated with the mortgage-issuing institution and in real time to the expiration of the scheduled timeline, a message indicating that the mortgage institution has force-placed the insurance certificate for the property using a pre-defined letter template;

receiving data identifying a human intervention taken in connection with the output of the one or more exception rule machine learning models;

generating, as training data for retraining the one or more exception rule machine learning models, (i) the data identifying the human intervention taken in connection with the output of the one or more exception rule machine learning models, (ii) the standardized insurance information, and (iii) the plurality of waiver parameters;

retraining the one or more exception rule machine learning models using the training data to apply one or more updated exception rules, to thereby decrease human intervention on exceptions being identified and flagged by the one or more servers that are associated with the mortgage-issuing institution over time; and using the retrained one or more exception rule machine learning models to process subsequently received, standardized insurance information by applying the one or more updated exception rules.

17. A non-transitory computer storage medium encoded with a computer program, the computer program comprising instructions that when executed by one or more processors cause the one or more processors to perform operations comprising:

receiving, by one or more servers that are associated with a mortgage-issuing institution that imposes a requirement on borrowers to possess flood protection certificates and that provide real-time status tracking of insurance certificates for mortgaged properties for different kinds of mortgage insurance and from a particular borrower among multiple borrowers that are associated with the mortgage-issuing institution, and through a feed that is associated with the particular borrower, insurance information associated with a property, in a received format as sent by the particular borrower;

standardizing the insurance information associated with the property from the received format into a textual format according to one or more naming conventions;

upon expiration of a scheduled timeline that is associated with the particular borrower, retrieving, by the one or more servers that are associated with the mortgage-issuing institution and from one or more servers that are associated with a government agency, one or more compliance rules related to the standardized insurance information;

automatically determining, by the one or more servers that are associated with the mortgage-issuing institution, that the standardized insurance information in the textual format indicates a non-compliant status for at least one of the one or more compliance rules;

in response to determining that the insurance information indicates the non-compliant status for at least one of the one or more compliance rules, processing, by the one or more servers that are associated with the mortgage-issuing institution, the standardized insurance information using one or more exception rule machine learning models that apply one or more exception rules that define an acceptable discrepancy between two or more terms of the standardized insurance information, to output an exception waiver comprising a plurality of waiver parameters that includes a parameter that identifies the at least one of the one or more compliance rules for which the non-compliant status was automatically determined;

generating, by the one or more servers that are associated with the mortgage-issuing institution and using at least some of the standardized insurance information and the plurality of waiver parameters, a feature matrix that includes data for the standardized insurance information and the plurality of waiver parameters;

providing, by the one or more servers that are associated with the mortgage-issuing institution and to a first machine learning-trained waiver model, the feature matrix that includes data for the standardized insurance information and the plurality of waiver parameters to cause the first machine learning-trained, waiver model to determine a first waiver confidence score for the standardized insurance information that is based on the one or more exception rules and that is associated with the property;

receiving, by the one or more servers that are associated with the mortgage-issuing institution and from the first machine learning-trained waiver model, the first waiver confidence score for the standardized insurance information that is based on the one or more exception rules and that is associated with the property;

determining that the first waiver confidence score fails to satisfy a first predetermined threshold;

only after determining that the first waiver confidence score fails to satisfy the first predetermined threshold, providing, by the one or more servers that are associated with the mortgage-issuing institution and to a different, second machine learning-trained waiver model, the feature matrix that includes data for the standardized insurance information and the plurality of waiver parameters to cause the second machine learning-trained waiver model to determine a second waiver confidence score for the standardized insurance information that is based on the one or more exception rules and that is associated with the property;

receiving, by the one or more servers that are associated with the mortgage-issuing institution and from the second machine-learned waiver model, the second waiver confidence score for the standardized insurance information that is based on the one or more exception rules and that is associated with the property;

based on whether the second waiver confidence score satisfies a threshold confidence score, selectively force-placing, by the one or more servers that are associated with the mortgage-issuing institution, an insurance certificate for the property, and automatically transmitting, by an integrated email module of the one or more servers that are associated with the mortgage-issuing institution and in real time to the expiration of the scheduled timeline, a message indicating that the mortgage institution has force-placed the insurance certificate for the property using a pre-defined letter template;

receiving data identifying a human intervention taken in connection with the output of the one or more exception rule machine learning models;

generating, as training data for retraining the one or more exception rule machine learning models, (i) the data identifying the human intervention taken in connection with the output of the one or more exception rule machine learning models, (ii) the standardized insurance information, and (iii) the plurality of waiver parameters;

retraining the one or more exception rule machine learning models using the training data to apply one or more updated exception rules, to thereby decrease human intervention on exceptions being identified and flagged by the one or more servers that are associated with the mortgage-issuing institution over time; and using the retrained one or more exception rule machine learning models to process subsequently received, standardized insurance information by applying the one or more updated exception rules.

\* \* \* \* \*

UNITED STATES PATENT AND TRADEMARK OFFICE
CERTIFICATE OF CORRECTION

| | |
|---|---|
| PATENT NO. | : 11,620,713 B2 |
| APPLICATION NO. | : 15/725540 |
| DATED | : April 4, 2023 |
| INVENTOR(S) | : Peter Ashly et al. |

It is certified that error appears in the above-identified patent and that said Letters Patent is hereby corrected as shown below:

On the Title Page

Column 2 (Other Publications), Line 1, delete "Artifical" and insert -- Artificial --.

In the Claims

In Claim 10, Column 22, Line 34, delete "He" and insert -- The --.

Signed and Sealed this
Sixth Day of June, 2023

Katherine Kelly Vidal
*Director of the United States Patent and Trademark Office*